US006188701B1

(12) United States Patent
Tsukamoto et al.

(10) Patent No.: US 6,188,701 B1
(45) Date of Patent: Feb. 13, 2001

(54) APPARATUS AND METHOD FOR INTERFACING BETWEEN COMMUNICATION NETWORKS

(75) Inventors: Keiichiro Tsukamoto; Akihiko Oka, both of Kanagawa (JP)

(73) Assignee: Fujitsu Limited, Kawasaki (JP)

( * ) Notice: Under 35 U.S.C. 154(b), the term of this patent shall be extended for 0 days.

(21) Appl. No.: 09/038,386

(22) Filed: Mar. 11, 1998

(30) Foreign Application Priority Data

Oct. 13, 1997 (JP) .................................................. 9-279051

(51) Int. Cl.[7] ........................................................ H04J 3/04
(52) U.S. Cl. ............................................. 370/535; 370/467
(58) Field of Search .................................... 370/465, 466, 370/467, 535, 542, 543, 544, 907

(56) References Cited

U.S. PATENT DOCUMENTS

| 5,001,711 | * | 3/1991 | Obana et al. ........................ 370/535 |
| 5,131,013 | * | 7/1992 | Choi .................................... 375/372 |
| 5,235,332 | * | 8/1993 | Stephenson, Jr. .................... 341/50 |

OTHER PUBLICATIONS

Signal Formats "Transport Systems Generic Requirements(TSGR): Common Requirements" TR–NWT–000499; Nov. 4, 1991 pp. 10–1, 10–17–10–20 and 10–22–10–24.

* cited by examiner

*Primary Examiner*—Huy D. Vu
*Assistant Examiner*—Alexander Boakye
(74) *Attorney, Agent, or Firm*—Helfgott & Karas, P.C.

(57) ABSTRACT

Conventionally, since in an ADM apparatus being an interface apparatus between a DS3 network and a SONET network a DS3 frame is mapped into an STS1 frame, the multiplexing and demultiplexing of the STS1 frame has to be carried out in units of DS3 frames. For this reason, the DS3 frame is demultiplexed and converted to a DS2 frame, and then to a DS1 frame, the DS1 frame is multiplexed and converted to a VT1.5 frame, and this VT1.5 frame is mapped into an STS1 frame. Since the VT1.5 frame is synchronized with the STS1 frame, the multiplexing and demultiplexing processes can be carried out in smaller units of the VT1.5 frame. Accordingly, data can be distributed on smaller units on a network.

19 Claims, 25 Drawing Sheets

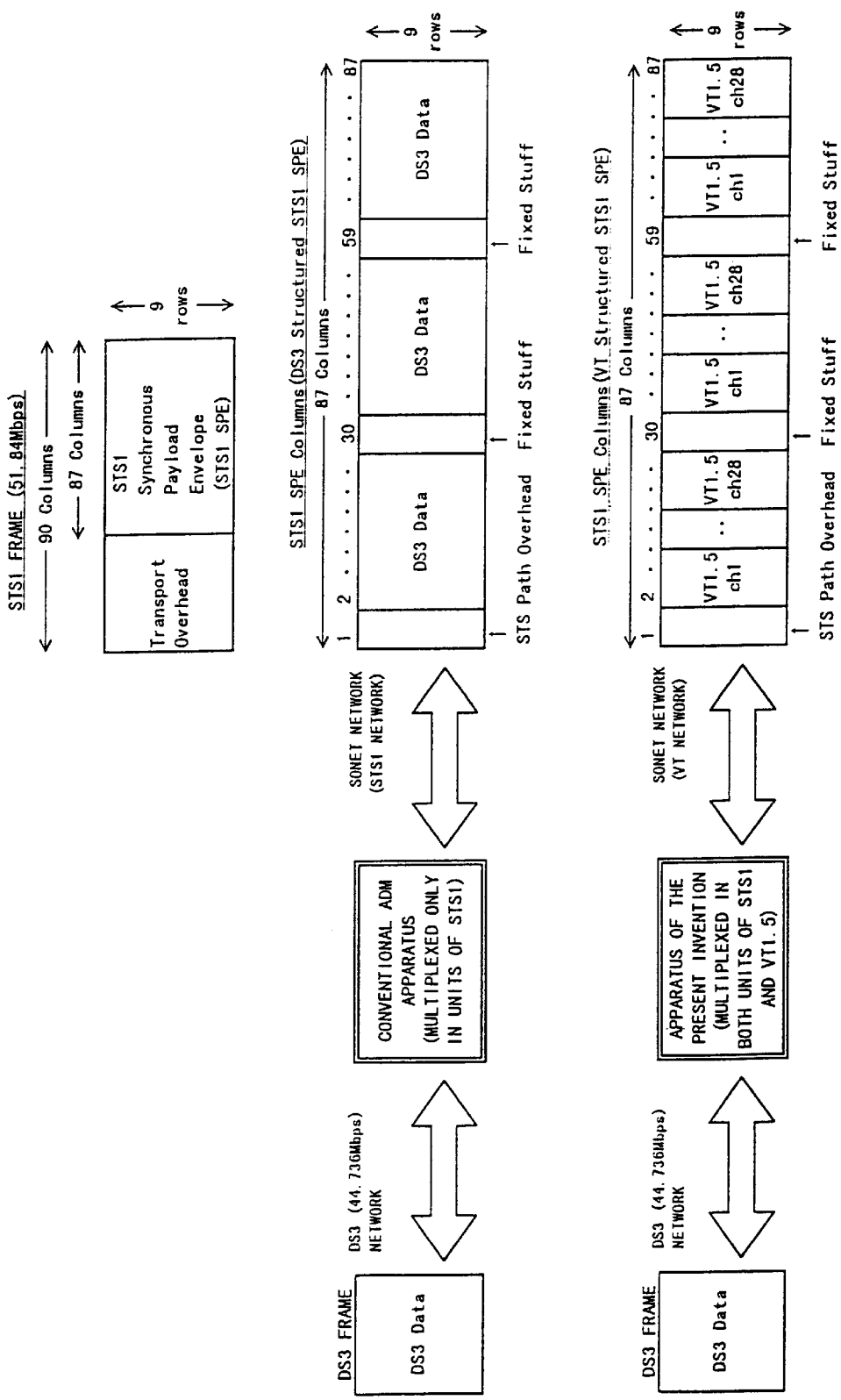
F I G. 8

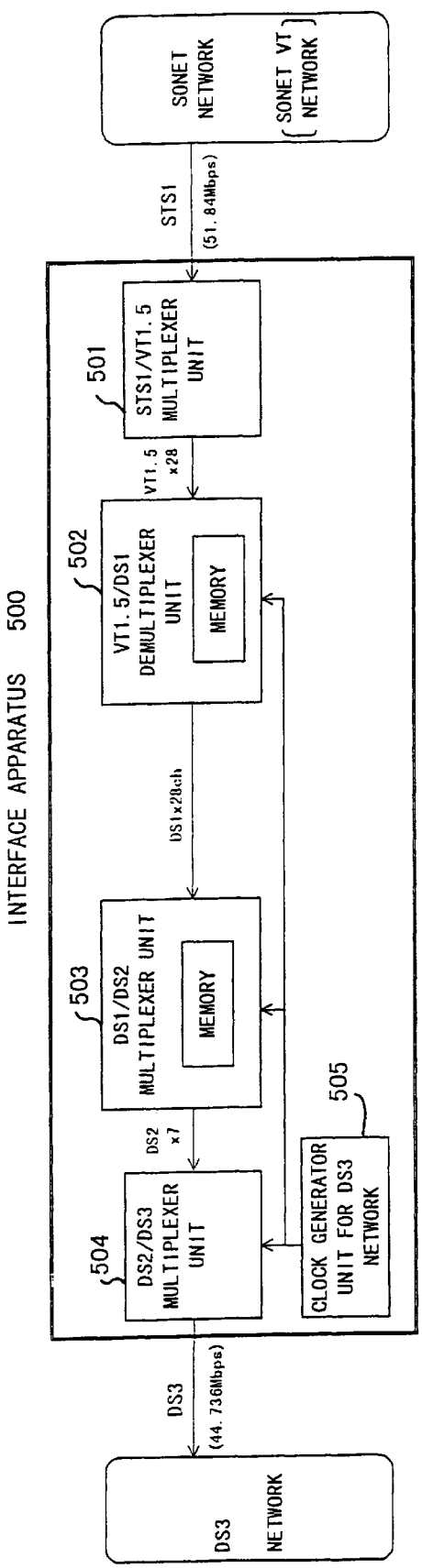
F I G. 1 2

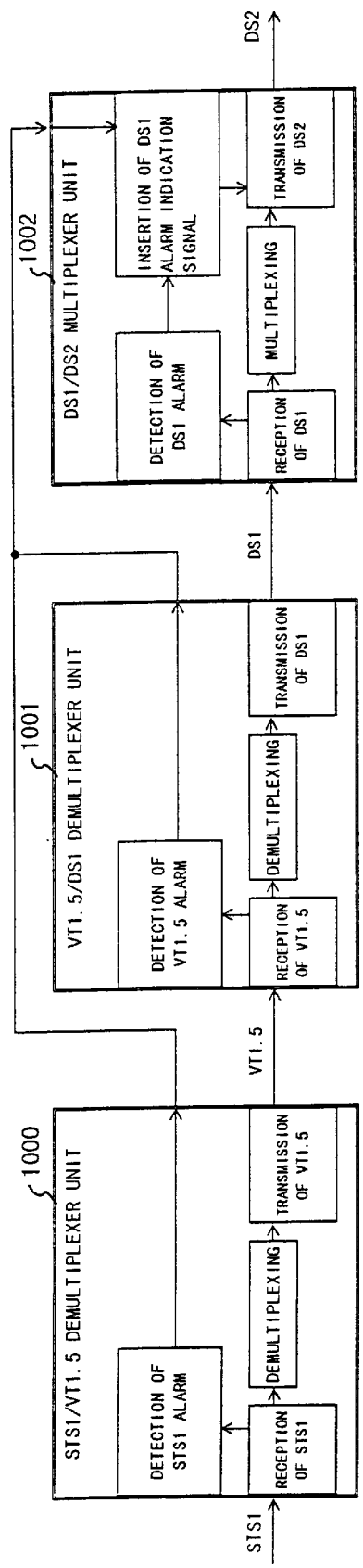
F I G. 21

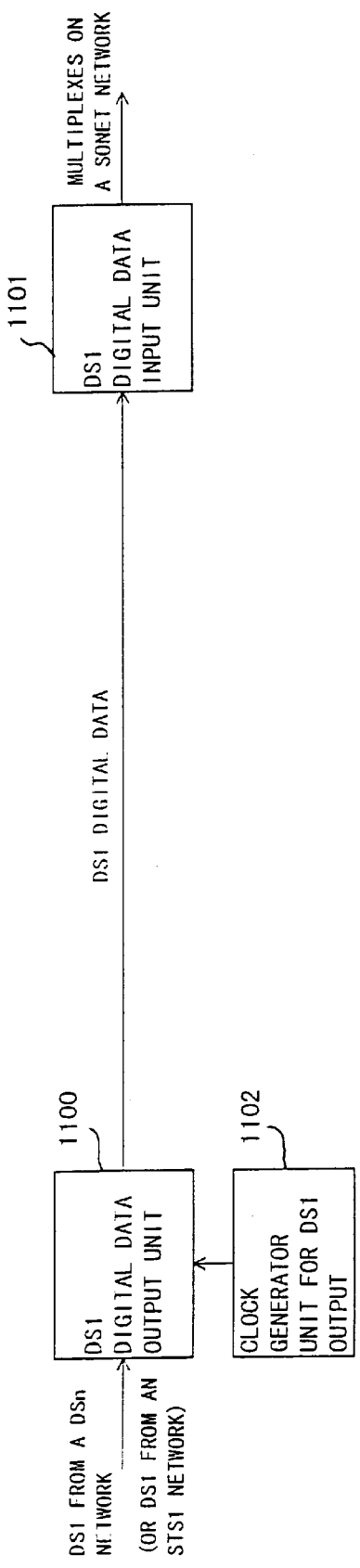
F I G. 24

APPARATUS AND METHOD FOR INTERFACING BETWEEN COMMUNICATION NETWORKS

BACKGROUND OF THE INVENTION

1. Field of the Invention

The present invention relates to an apparatus for interfacing between different networks.

2. Description of the Related Art

Currently there are networks using asynchronous signals (hereinafter called a DSn network) and networks using synchronous (SONET) signals (hereinafter called a SONET network) in the transmission networks of North America, etc. When a DSn network and a SONET network are connected, a SONET optical transmission apparatus is used. Although an apparatus for connecting a network using a DS3 (44.736 Mbps) signal (hereinafter called a DS3 network) to a network in which signals can be demultiplexed and multiplexed in units of STS1 (51.84 Mbps, a frame format of a SONET network) in the SONET network (hereinafter called a SONET STS1 network), is implemented, an apparatus for connecting a network using the DS3 (44.736 Mbps) signal to a network in which signals can be demultiplexed and multiplexed in units of VT1.5 (1.728 Mbps, a signal provided to easily add/drop-multiplex the payload of an STS signal, given the abbreviation VT of virtual tributary) in the SONET network (hereinafter called a SONET VT network), is not implemented yet.

That is, a conventional apparatus can multiplex and demultiplex DS3 signals received from a DSn network only in units of STS1 units (51.84 Mbps) in the SONET network, but cannot multiplex and demultiplex the DS3 signals in units of VT1.5 units (1.728 Mbps).

The SONET network and the DS3 network are formed independently of each other. Therefore, if a DS3 signal is connected to the SONET network, the conventional apparatus cannot monitor the condition of the DS2 signal in a DS3 signal, nor a DS1 signal in the DS3 network, though the apparatus can monitor the condition of the connecting signal of the DS3 signal.

Recently there has been an increasing demand for an apparatus in which signals can be multiplexed and demultiplexed in units of VT1.5 while operating the DS3 network, and that which can enter a SONET VT network. It is an object of the present invention to provide an apparatus for converting DS3 signals to VT1.5 signals, and constructing a VT1.5 network so that an apparatus supporting the SONET VT network can receive the services of a network using the DS3 (44.736 Mbps) signal.

FIG. 1 shows the configuration in the case where a SONET VT network is connected to a DS3 network by combining a conventional M13 apparatus and a conventional ADM apparatus. First, an STS1 input signal from the SONET VT network is demultiplexed and converted by an ADM 2700. The STS1 signal transmitted from a SONET network is first demultiplexed and converted to VT signals by an STS1/VT1.5 demultiplexer unit 2702, and further demultiplexed and converted to DS1 signals by a VT1.5/DS1 demultiplexer unit 2703. When the VT signals are demultiplexed and converted to the DS1 signals, the signals stored in the memory of the VT1.5/DS1 demultiplexer unit 2703 are output synchronized with a clock generated by a clock generator unit for the DS1 network 2704. When the DS1 signals demultiplexed and converted in this way are multiplexed and converted to a number of DS2 signals, the DS1 signals are stored once in a memory of an M13 apparatus, read using a DS2 clock, and multiplexed to the DS2 signals. Furthermore, these DS2 signals are synchronized with a clock signal from a clock generator unit for the DS3 network 2707, are stored once in the memory of a DS2/DS3 multiplexer unit 2706, are read using a clock for a DS3 network, are multiplexed and converted to a DS3 signal, and sent out to the DS3 network. However, the provision of a memory for 28 channels of DS1 in an apparatus in order to multiplex and convert DS1 signals to DS2 signals leads to large-scale circuitry and an increased consumption of power.

FIG. 2 shows the configuration in the case where a network using a DS3 (44.736 Mbps) signal is connected to a SONET network by using a conventional apparatus. In this case, the DS3 network can be connected only to a SONET STS1 (51.84 Mbps) network, and only the condition of a DS3 signal can be monitored for an asynchronous network, and both DS2 and DS1 signals in the DS3 signal cannot be monitored.

That is, when a conventional ADM 2800 is used, the DS3 signal received from the DS3 network is converted by a DS3/STS1 multiplexer unit 2803, and the alarm signal of the DS3 signal is detected by a DS3 alarm detector unit 2802, which is reported to a SONET condition reporting unit 2801. Since the SONET condition reporting unit 2801 transmits this alarm signal to the SONET network via an intra-apparatus condition monitor unit, the alarm information of the DS3 signal is sent to the SONET network, but the alarm information of both DS2 and DS1 signals cannot be extracted.

FIG. 3 shows the configuration in the case where a DS3 network is connected to a SONET VT network by combining a conventional M13 apparatus and a conventional ADM apparatus. In this case, the condition of DS3, DS2 and DS1 signals can be monitored by the M13 apparatus, but cannot be monitored in a SONET network, since the M13 apparatus and the ADM apparatus are different apparatuses.

That is, since the conventional M13 apparatus 2900 and the conventional ADM apparatus 2906 are configured independently, and both M13 apparatus 2900 and ADM apparatus 2906 are configured to transmit an alarm signal only to a DS3 network and a SONET network, respectively, the alarm information of the SONET network cannot be monitored from the DS3 network. The DS3 signal transmitted from the DS3 network is input to the DS3/DS2 demultiplexer unit 2902 of the M13 apparatus 2900, an alarm is detected by a DS3 alarm detector unit 2903, and the result of alarm detection is transmitted to the DSn condition reporting unit 2901. The DS2 signals output from the DS3/DS2 demultiplexer unit 2902 are input to a DS2/DS1 demultiplexer unit 2904, the signals are converted to DS1 signals, an alarm is detected by a DS2 alarm detector unit 2905, and the result of alarm detection is transmitted to a DSn condition reporting unit 2901. The DSn condition reporting unit 2901 is configured to transmit the result of the alarm detection to the DS3 network, and the detection result of the DS3 and DS2 alarms obtained in the M13 apparatus is not transmitted to the SONET network. To the conventional ADM apparatus 2906 are sent the DS1 signals demultiplexed and converted by the M13 apparatus 2900. In the ADM apparatus 2906 the DS1 signals are converted to VT1.5 signals by a DS1/VT1.5 multiplexer unit 2907, and a DS1 alarm detector unit 2908 detects the alarm of a DS1 signal and transmits the alarm to a SONET condition reporting unit 2910. The SONET condition reporting unit 2910 transmits the result of this alarm detection to the SONET network. On the other hand, the VT1.5 signals converted by the DS1/VT1.5 multiplexer unit 2907 are transmitted to a VT1.5/STS1 multiplexer unit 2909, and are converted to an STS1 signal, which is sent to the SONET network.

That is, the SONET network and the DSn network are formed independently of each other, and when a DSn network is connected to a SONET network using a conventional unit, only the information of the DSn signal at the contact point connected to the SONET network can be monitored.

Currently when a DS3 signal is connected to a SONET VT network, there is a demand for the condition monitoring and management of the DS2 and DS1 signals in the DS3 signal, even in the SONET VT network.

In one aspect of the present invention, the method for connecting to the SONET VT network by converting the DS3 (44,736 Mbps) signal to the DS1 (1,544 Mbps) signal once in the apparatus is utilized as means for connecting the DSn network to a SONET network. However, when converting the DS3 signal to the DS1 signal, the method described below is usually utilized in the conventional method. FIG. 4 shows the configuration of the system. The system comprises a DS3/DS2 demultiplexer unit 3000, a DS2/DS1 demultiplexer unit 3001 and a DS1/VT1.5 multiplexer unit 3002. The DS3 signal is terminated by a DS3 receiver unit 3003 of the DS3/DS2 demultiplexer unit 3000, and a DS3 alarm is detected. The alarm of the DS3 signal is inserted in a DS2 signal demultiplexed from the DS3 signal as an alarm indication signal by a DS2 transmitter unit 3005, and the DS2 signal is output. Furthermore, the DS2 signal is terminated by the DS2 receiver unit 3006 of the DS2/DS1 demultiplexer unit 3001, a DS2 alarm is detected, the alarm of the DS2 signal is inserted in the DS1 signal demultiplexed from the DS2 signal as an alarm indication signal of the DS1 signal by a DS1 transmitter unit 3008, and the DS1 signal is output. In the same way, in the DS1/VT1.5 multiplexer unit 3002 a transmitted DS1 signal is received by a DS1 receiver unit 3009, a DS1 alarm is detected, and the alarm of the DS1 signal is inserted in a VT1.5 signal multiplexed and converted from the DS1 signal as an alarm indication signal of the VT1.5 signal by a VT1.5 transmitter unit 3011, and the VT1.5 signal is transmitted.

When a DSn network is connected to a SONET network by combining a conventional M13 apparatus and a conventional ADM apparatus, this method is adopted. Currently, when this method is adopted, there are many processes of each of DS3, DS2 and DS1 signals, and the circuitry scale becomes large, since 7 channels of DS2 and 28 channels of DS1 of both alarm detector and alarm indication signal inserting circuits have to be provided.

In the same way, when in a conventional method a SONET network is connected to a DS3 (44.736 Mbps) network, a VT1.5 signal is extracted from an STS1 signal, and the VT1.5 signal is further converted to a DS1 signal, the following method is generally used. FIG. 5 shows the configuration of the system. The system comprises an STS1/VT1.5 demultiplexer unit 3100 and a VT1.5/DS1 demultiplexer unit 3101. An STS1 signal is terminated by the STS1 receiver unit 3103 of the STS1/VT1.5 demultiplexer unit 3100, an STS1 alarm is detected, the alarm of the STS1 signal is inserted in a VT1.5 signal extracted from the STS1 signal as the alarm indication signal of the VT1.5 signal by a VT1.5 transmitter unit 3105, and the VT1.5 signal is output. In the VT1.5/DS1 demultiplexer unit 3101 the signal is terminated by a VT1.5 receiver unit 3106, the alarm of the VT1.5 signal is detected, the VT1.5 signal is demultiplexed and converted to a DS1 signal, an alarm signal extracted from the VT1.5 signal is inserted in the DS1 signal as an alarm indication signal, and the DS1 signal is output. In a DS1/DS2 multiplexer unit 3102 the above-mentioned DS1 signal is received by a DS1 receiver unit 3109, an alarm is detected, the above-mentioned alarm is inserted in the DS2 signal as a DS1 alarm indication signal after the DS1 signal is multiplexed and converted to a DS2 signal, and the DS2 signal is transmitted from a DS2 transmitter unit 3111. In the same way, a converter unit for multiplexing and converting the DS2 signal to a DS3 signal is provided on the latter stage of the DS1/DS2 multiplexer unit 3102, and the DS3 signal is sent to the DS3 network.

When a conventional technology is used as a method to convert a DS3 (44.736 Mbps) to a DS1 (1.544 Mbps) once, and to then further convert to a VT1.5 signal, and to connect the signal to a SONET VT network, it is necessary to provide both a conventional ADM apparatus which can be connected to the SONET VT network using a DS1 signal, and a conventional M13 apparatus for carrying out DS3/DS1 conversion. In this case, the DS1 signal interfacing between a DS3/DS1 converter and a device for connecting a DS1 signal to a SONET VT network is an inter-apparatus communication. When forming the DS1 interface in order to make a DS1 inter-apparatus interface, as shown in FIG. 6, a DS1 digital data output unit 3200, a clock generator unit for DS1 output 3203, a DS1 uni-polar data output unit 3201, a DS1 uni-polar/bi-polar converter unit 3202, a DS1 bi-polar/uni-polar converter unit 3204, a DS1 uni-polar data input unit 3205 and a DS1 digital data input unit 3206 have to be provided, and in the M13 apparatus 3150 DS1 digital data extracted from a DSn network are B8ZS-encoded synchronized with a clock generated by the clock generator unit for DS1 output 3203 in the digital data output unit 3200, and are output to the DS1 uni-polar data output unit 3201. The encoded DS1 digital data are converted to DS1 uni-polar data by the DS1 uni-polar data output unit 3201, and are output to the DS2 uni-polar/bi-polar converter unit 3202. The DS1 uni-polar data are converted to DS1 bi-polar data by the DS1 uni-polar/bi-polar converter unit 3202, and are output to the DS1 bi-polar/uni-polar converter unit 3204. The DS1 bi-polar data are converted to DS1 uni-polar data by the DS1 bipolar/uni-polar converter unit 3204, and are output to the DS1 uni-polar data input unit 3205. In the DS1 uni-polar data input unit 3205 the DS1 uni-polar data are converted to DS1 digital data, and are output to the DS1 digital data input unit 3206. In the DS1 digital data input unit 3206 B8ZS-encoded data are decoded, and the decoded DS1 digital data are transmitted to the SONET network. The reverse process is executed in the same way. Currently, when this method is used, there are many signal processes performed on a DS1 signal, which leads to an increased number of signal processing circuits.

FIG. 7 shows the case where in a prior art STS1, VT1.5 and DS1 signals from a SONET VT network are converted in that order, DS1, DS2 and DS3 signals are multiplexed in that order, and the DS3 signal is output to a DSn network. The system comprises an STS1/VT1.5 demultiplexer unit 3300, a VT1.5/DS1 demultiplexer unit 3301, a clock generator unit for DS3 network 3303, a DS1/DS2 multiplexer unit 3302 and a DS2/DS3 multiplexer unit 3304. In the STS1/VT1.5 demultiplexer unit 3300 an input STS1 signal is terminated. The terminated STS1 signal is demultiplexed and converted to VT1.5 signals, which are output to the VT1.5/DS1 demultiplexer unit 3301. The terminated VT1.5 signals are demultiplexed and converted to DS1 signals, which are output to the DS1/DS2 multiplexer unit 3302. In the DS1/DS2 multiplexer 3302 the DS1 signals are multiplexed and converted to DS2 signals synchronized with a clock generated by the clock generator unit for DS3 network 3303, which are output to the DS2/DS3 multiplexer unit 3304. Although an STS1 signal in the SONET network generated is at this moment demultiplexed and converted, and the frequency offset generated by the fluctuation in the bit number at a destuff process at the time of destuff-demultiplexing is stored in the DS1, the frequency offset is absorbed by a stuffing process when stuff-multiplexing and converted to a DSn signal. There is also a method where in the DS2/DS3 multiplexer unit 3304 the input DS2 signals are multiplexed and converted to a DS3 signal, which is output to a DS3 network. In this case, 8 bits of bit stuff to be used for the stuffing process of a SONET signal cause an instantaneous frequency offset in the DS1 signal at the time of destuffing, which in turn causes jitters in the DS1 signal. When the DS1 signals are multiplexed and converted to DS2 signals, and then to a DS3 signal in order, these jitters are absorbed by 1 bit of bit stuff to be used in a stuffing process of a DSn signal. However, when 8 bits of stuff bit are frequently generated by the destuffing process of a SONET signal, the jitters caused by the frequency offset generated by the destuffing process cannot be absorbed by 1 bit of stuff bit of a DSn signal, and a signal error may be caused.

SUMMARY OF THE INVENTION

It is an object of the present invention to provide an apparatus for interfacing between networks which solves the above-mentioned problems and supports data signals not synchronous with each other and with a plurality of different transmission rates.

The interface apparatus in the first aspect of the present invention is an apparatus for interfacing between a first network supporting data signals with a plurality of different transmission rates, and a second network not synchronous with the first network with a higher transmission rate than the first network. The apparatus for interfacing is characterized in that the apparatus comprises a demultiplexing unit for demultiplexing and converting a data signal of the above-mentioned first network by stages from a data signal with a higher transmission rate to a data signal with a lower transmission rate, generating a data signal with the lowest transmission rate, and extracting failure information on each stage of the demultiplexing and conversion process, and a multiplexing unit for inserting the above-mentioned failure information in the above-mentioned data signal with the lowest transmission rate, multiplexing and converting the above-mentioned data signal with the lowest transmission rate to the first data signal with a lower transmission rate supported by the above-mentioned second network, and multiplexing and converting the first data signal to the second data signal with a standard transmission rate, supported by the above-mentioned second network.

The interface apparatus in the second aspect of the present invention is an apparatus for interfacing between a first network supporting data signals with a plurality of different transmission rates, and a second network not synchronous with the first network with a higher transmission rate than the first network. The apparatus for interfacing is characterized in that the apparatus comprises a demultiplexing unit for demultiplexing and converting a data signal with the standard transmission rate of the above-mentioned second network to a data signal synchronized with a data signal with the standard transmission rate and with a lower transmission rate than the standard transmission rate, demultiplexing and converting the data signal to a data signal with the lowest transmission rate of the above-mentioned first network, and extracting failure information on each stage of the demultiplexing and conversion process, and a multiplexing unit for inserting the above-mentioned failure information in the above-mentioned data signal with the lowest transmission rate of the above-mentioned first network, multiplexing and converting the above-mentioned data signal with the lowest transmission rate by stages to the first data signal with a higher transmission rate, supported by the above-mentioned first network.

The method of the first aspect of the present invention is a method of interfacing between a first network supporting data signals with a plurality of different transmission rates, and a second network not synchronous with the first network with a higher transmission rate than the first network. The method is characterized in that the method comprises (a) a step for demultiplexing and converting data signals of the above-mentioned first network by stages from a data signal with a higher transmission rate to a data signal with a lower transmission rate, generating a data signal with the lowest transmission rate, and extracting failure information on each stage of the demultiplexing and conversion process, and (b) a multiplexing step for inserting the above-mentioned failure information in the above-mentioned data signal with the lowest transmission rate, multiplexing and converting the above-mentioned data signal with the lowest transmission rate to the first data signal with a lower transmission rate supported by the above-mentioned second network, and multiplexing and converting the first data signal to the second data signal with a standard transmission rate, supported by the above-mentioned second network.

The method of the second aspect of the present invention is a method of interfacing between a first network supporting data signals with a plurality of different transmission rates, and a second network not synchronous with the first network with a higher transmission rate than the first network. The method of interfacing is characterized in that the method comprises (a) a step for demultiplexing and converting a data signal with the standard transmission rate of the above-mentioned second network to a data signal synchronous with a data signal of the standard transmission rate, demultiplexing and converting the data signal to a data signal with the lowest transmission rate of the above-mentioned first network, and extracting failure information on each stage of the demultiplexing and conversion process, and (b) a step for inserting the above-mentioned failure information in the above-mentioned data signal with the lowest transmission rate of the above-mentioned first network, and multiplexing and converting the above-mentioned data signal with the lowest transmission rate by stages to a data signal with a higher transmission rate, supported by the above-mentioned first network.

The interface apparatus of the third aspect of the present invention is an apparatus for supporting the demultiplexing and multiplexing of signals in units of VT1.5 in a SONET network. The apparatus is characterized in that the apparatus comprises a DS3/DS2 demultiplexing unit for demultiplexing and converting a DS3 signal to DS2 signals, a DS2/DS1 demultiplexing unit for demultiplexing and converting DS2 signals to DS1 signals, a memory unit for a DS1 format conversion for recording data in order to compensate for a frequency offset caused while demultiplexing and converting DS3 signals to DS1 signals, and outputting the data synchronized with a supplied clock signal, a clock generating unit for a SONET VT network for supplying a clock signal for outputting the data stored in the above-mentioned memory unit for DS1 format conversion at the transmission rate of the SONET VT network, and a DS1/VT1.5 multiplexing unit for multiplexing and converting DS1 signals to a VT1.5 signal synchronized with the clock signal generated by the above-mentioned clock generating unit for the SONET VT network, and the apparatus further comprises an STS1/VT1.5 demultiplexing unit for demultiplexing and converting an STS1 signal to VT1.5 signals, a VT1.5/DS1 demultiplexing unit for demultiplexing and converting VT1.5 signals to DS1 signals, a clock generating unit for a DS3 network for generating a clock signal synchronous with the transmission rate of a DS3 network, a DS1 clock generating unit for generating a clock signal synchronous with the DS1 signal, a memory unit for a SONET destuff process for storing data in order to compensate for a frequency offset caused while demultiplexing and converting an STS1 signal to DS1 signals, and outputting the data synchronized with the clock signal generated by the above-mentioned DS1 clock generating unit, a DS1/DS2 multiplexing unit for multiplexing and converting the DS1 signals to DS2 signals synchronized with the clock signal generated by the above-mentioned clock generating unit for a DS3 network, and a DS2/DS3 multiplexing unit for multiplexing and converting the DS2 signals to a DS3 signal synchronized with the clock generated by the above-mentioned clock generating means for a DS3 network, and that by converting the DS3 signal to a VT1.5 signal, the apparatus supports the demultiplexing and multiplexing of signals in units of VT1.5 in the SONET network, and provides direct interface to a DS3 network.

By adopting the present invention, DS3 signals in a DS3 network can be connected to a SONET network in which processes such as multiplexing and demultiplexing, etc. can be executed in units of VT1.5 using one apparatus, and the service of entering a SONET VT network from a DS3 network becomes available by means of one apparatus.

The multiplexing and conversion of signals becomes available without the memory conventionally required, the scale of circuitry can be greatly reduced, and the consumption of power can also be reduced.

A DSn network can also be monitored from a SONET network side.

Since jitters due to the frequency offset generated in a destuffing process can be suppressed, the occurrence of a signal error can be avoided.

BRIEF DESCRIPTION OF THE DRAWINGS

FIG. 8 compares the principle of the present invention with the prior art.

FIG. 12 shows the configuration of the interface apparatus of the third embodiment of the present invention.

FIG. 21 shows the configuration of the interface apparatus of the eighth embodiment of the present invention.

FIG. 24 explains a DS1 interface apparatus being the ninth embodiment of the present invention.

DESCRIPTION OF THE PREFERRED EMBODIMENTS

The present invention relates to a SONET/DS3 transmission multiplexer (TRANS MUX) in an add/drop multiplexer (ADM) to be used in a synchronous optical network. The interface apparatus (SONET/DS3 TRANS MUX) of the present invention can be used in an ADM to be used in a new synchronous signal network in accordance with the synchronous optical network (SONET)(see ANSI TI-105) in the U.S. and the telecommunication technology committee (TTC) standards (see JT-G707, JTG708 and JT-G709) in Japan.

Although the description is made for the case of SONET below, correspondence between the SONET and the TTC standards are publicly known.

In the present invention, as means for connecting a DSn network to a SONET network, a conventional method of overlaying a DS3 signal on an STS1 format being a method of mapping signals into a SONET network is abandoned, and the DS3 signal is connected to a SONET VT network by overlaying a VT1.5 signal on an STS1 format.

FIG. 8 compares the principle of the present invention with the prior art.

As shown in FIG. 8, an STS1 frame is composed of a transport overhead and an STS1 synchronous payload envelope (STS1 SPE). In the overhead, management information for data transmission is stored. As shown in FIG. 8, in the prior art, since an STS1 frame is composed of units of DS3 data, and a DS3 frame is not synchronous with the STS1 frame, signals can be multiplexed and demultiplexed only in units of STS1 frames, when signals are multiplexed and demultiplexed in an ADM apparatus. That is, even if information is distributed to various areas, data can be distributed only in units of STS1 frames, the data unit of which is large. However, since there is a possibility that DS3 data contained in an STS1 frame may include DS1 data with different destinations, information can be transmitted only in units of STS1 frames, and the information of a DS3 signal stored in the STS1 frame in units of DS1 data cannot be distributed for each destination.

On the other hand, in the present invention, since an STS1 frame is composed of units of VT1.5 (the present invention is not limited to this, but VT2, VT3, VT6, etc. are also acceptable) data, information can be distributed in units of data volume smaller than the STS1 frame.

Figure 9:
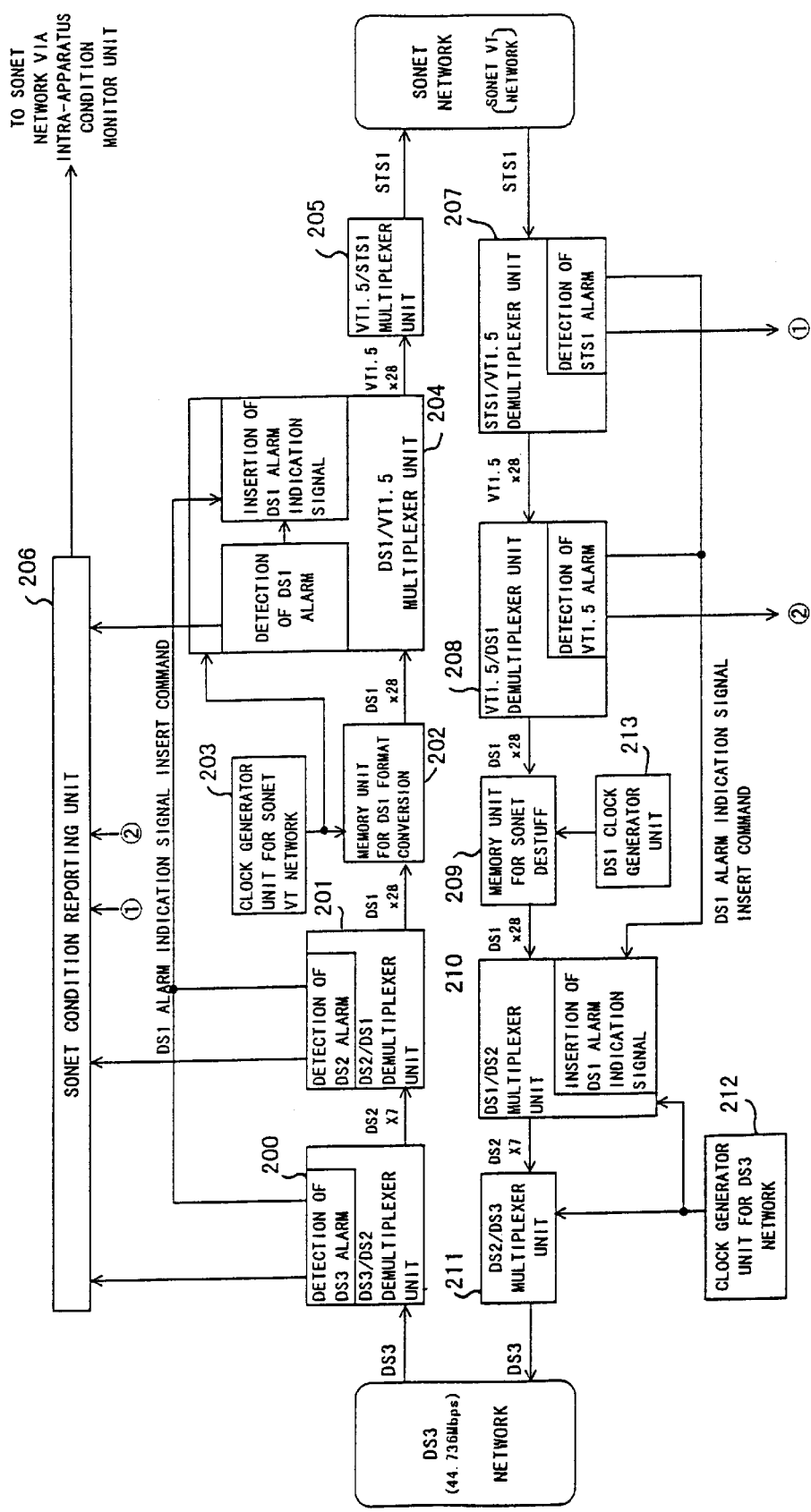
FIG. 9 shows the configuration of the interface apparatus of the first embodiment of the present invention.

FIG. 9 shows the configuration of the interface apparatus of the first embodiment of the present invention. This apparatus comprises a DS3/DS2 demultiplexer unit 200 for demultiplexing and converting a DS3 signal into 7 channels of DS2 signals, a DS2/DS1 demultiplexer unit 201 for demultiplexing and converting DS2 signals into 4 channels of DS1 signals, a memory unit for DS1 format conversion 202 for smoothing data when a DS3 signal is destuffed to DS2 signals, and then DS1 signals, a clock generator unit for SONET VT network 203 for supplying a clock synchronous with a SONET network, a DS1/VT1.5 multiplexer unit 204 for multiplexing and converting DS1 signals to VT1.5 signals for a SONET network, and a VT1.5/STS1 multiplexer unit 205 for multiplexing and converting 28 channels of VT1.5 signals to an STS1 signal. The apparatus further comprises an STS1/VT1.5 demultiplexer unit 207 for demultiplexing an STS1 signal into 28 channels of VT1.5 signals, a VT1.5/DS1 demultiplexer unit 208 for demultiplexing and converting VT1.5 signals of a SONET network to DS1 signals, a memory unit for SONET destuff 209 for smoothing data when an STS1 signal is destuffed to VT1.5 signals, a DS1 clock generator unit 213 for supplying the memory unit 209 with a DS1 clock (1.544 Mbps), a DS1/DS2 multiplexer unit 210 for multiplexing and converting 4 channels of DS1 signals to DS2 signals, a clock generator unit for DS3 network 212 for supplying a clock synchronous with a DS3 network, and a DS2/DS3 multiplexer unit 211 for multiplexing and converting 7 channels of DS2 signals to a DS3 signal. The apparatus further comprises a SONET condition reporting unit 206 for monitoring the condition of each signal.

First, a DS3 (44.736 Mbps) signal input from a DS3 network is terminated by the DS3/DS2 demultiplexer unit 200. At this time, a detected higher-order group alarm (alarm information in a higher-order, that is, a higher-speed network when networks are hierarchically configured from a lower-speed network to a higher-speed network; alarms in a DS3 network are higher-order group alarms than alarms in a DS1 network) is reported to the DS1/VT1.5 multiplexer unit 204 as a DS1 alarm indication signal insertion signal. The terminated DS3 signal is demultiplexed and converted to 7 channels of DS2 signals, which are transmitted to the DS2/DS1 demultiplexer unit 201. In the DS2/DS1 demultiplexer unit 201 the input DS2 signals are terminated. At this time, a detected higher-order group alarm (in this case, an alarm of the DS2 signals) is reported to the DS1/VT1.5 multiplexer unit 204 as a DS1 alarm indication signal insertion signal. The terminated DS2 signals are demultiplexed and converted to 4 channels of DS1 signals, which are output to the memory unit for DS1 format conversion 202. In the memory unit for DS1 format conversion 202 the input DS1 signals destuffed by the DS2/DS1 demultiplexer unit 201 are stored in order to be multiplexed to a VT1.5 format (stuff-multiplexed), which are output to the DS1/VT1.5 multiplexer unit 204. In the DS1/VT1.5 multiplexer unit 204 the DS1 signals are multiplexed and converted to VT1.5 signals synchronized with the clock signal generated by the clock generator unit for SONET VT network 203, and output to the VT1.5/STS1 multiplexer unit 205. At this time, if a DS1 alarm indication signal (AIS) insertion signal is received, a DS1 AIS (sets all data of the DS1 to '1') is inserted in a DS1 signal of the VT1.5 signal, which is output. In the VT1.5/STS1 multiplexer unit 205 the input VT1.5 signals are multiplexed and converted to an STS1 signal, which is output to a SONET network (a SONET VT network supporting VT1.5 signals).

On the other hand, an STS1 signal input from a SONET network (a SONET VT network supporting VT1.5 signals) is terminated by the STS1/VT1.5 demultiplexer unit 207. At this time, a detected higher-order group alarm (when seen from a VT1.5 signal side, an STS1 alarm) is reported to the DS1/DS2 multiplexer unit 210 as a DS1 alarm indication signal insertion signal. The terminated STS1 signal is demultiplexed into 28 channels of VT1.5 signals, which are output to the VT1.5/DS1 demultiplexer unit 208. In the VT1.5/DS1 demultiplexer unit 208 the input VT1.5 signals are terminated. At this time, a detected higher-order group alarm (in this case, the VT1.5 alarm seen from the DS1 signal side) is reported to the DS1/DS2 multiplexer unit 210 as a DS1 alarm indication signal insertion signal). The terminated VT1.5 signals are demultiplexed and converted to DS1 signals, which are input to the memory unit for SONET destuff 209. In the memory unit for SONET destuff 209, in order to absorb the stuff in the STS1 and VT1.5 signals stored in the input DS1 signals, the DS1 signals are smoothed, which are then output to the DS1/DS2 multiplexer unit 210. In the DS1/DS2 multiplexer unit 210, 4 channels of DS1 signal are multiplexed and converted to DS2 signals synchronized with the clock signal generated by the clock generator unit 212 for a DS3 network after being smoothed, which are then output to the DS2/DS3 multiplexer unit 211. In the DS2/DS3 multiplexer unit 211, 7 channels of the input DS2 signals are multiplexed and converted to a DS3 signal, which is output to a DS3 network.

The SONET condition reporting unit 206 collects alarm information detected in each of the DS3/DS2 demultiplexer unit 200, the DS2/DS1 demultiplexer unit 201, the DS1/VT1.5 multiplexer unit 204, the STS1/VT1.5 demultiplexer unit 207, and the VT1.5/DS1 demultiplexer unit 208, sends the alarm information to the SONET network, and reports the alarm information to the manager of the SONET network. The SONET network manager manages the network based on this information.

Figure 10:
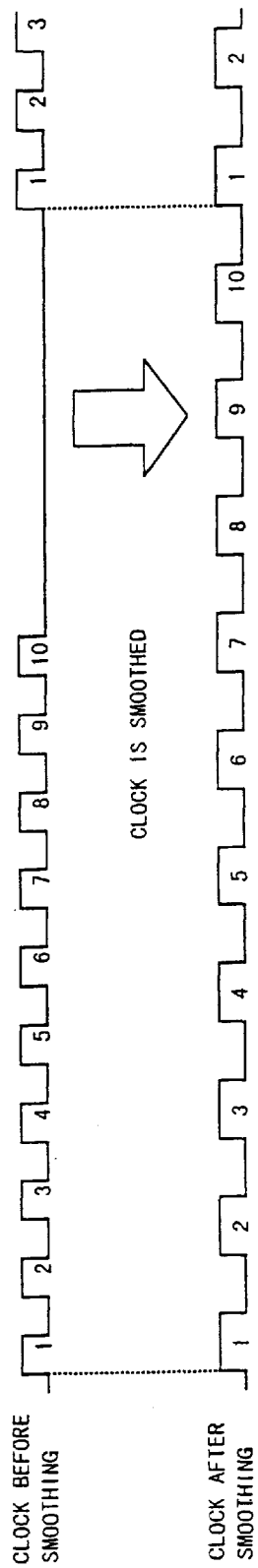
FIG. 10 explains the smoothing of signals in a destuff memory.

FIG. 10 explains the smoothing of signals in a destuff memory. As shown at the top of FIG. 10, when a DS1 signal is destuffed, management information data such as an overhead part attached to the DS1 signal, etc. are removed. Therefore, if the signal is output as it is, the signal of the payload part where there are data is output. However, the signal of the overhead where information has been removed, becomes in a non-signal state. Therefore, since there is a part with signals and a part without signals in the data immediately after destuffing, the frequency of the signal is fast in the data part, and becomes "0" in the part corresponding to the overhead, which causes a fluctuation in the frequency. If a signal like this is run in a network as it is, it becomes difficult to process the signal, and errors become easy to occur. For this reason, in this embodiment, the clock timing of the signal is smoothed. That is, destuffed signal data are stored in a memory, which are output synchronized with a clock signal with a signal speed of the data to be output. Thus, since signals are output matched with the uniform oscillated signal of a synchronous clock, the frequency of each signal can also be made a certain uniform value.

In FIG. 9, when a SONET network is interfaced with a DS3 network, DS1 signals are smoothed using a DS1 clock.

Next, even when a SONET STS1 signal in which a DS3 signal is mapped, is connected to a SONET network, the present invention provides an apparatus for performing a similar operation. In the prior art, a DS3 signal which is mapped into an STS1 signal can be multiplexed and demultiplexed only in units of STS1 (51.84 Mbps), and cannot be multiplexed and demultiplexed in units of VT1.5 (1.544 Mbps).

Figure 11:
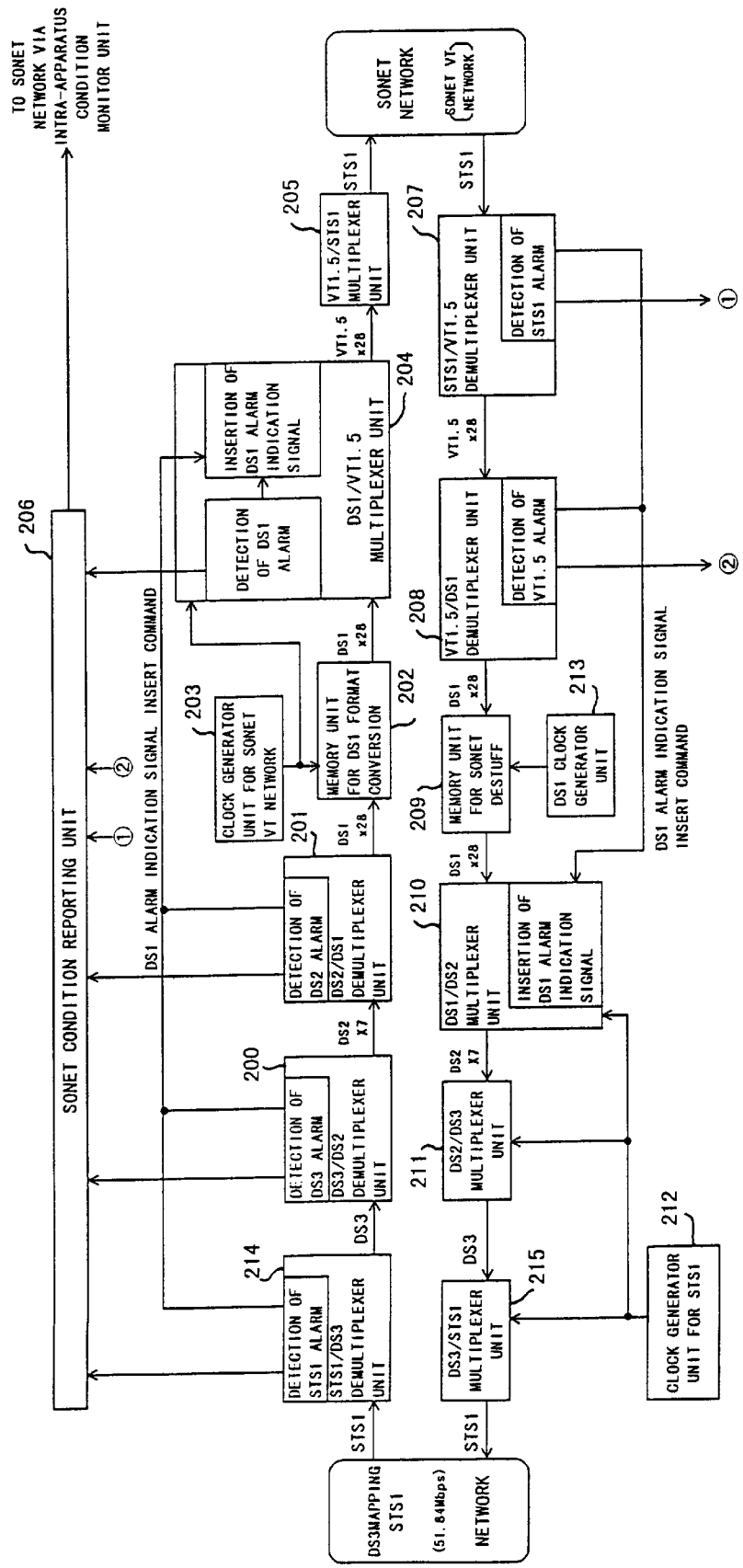
FIG. 11 shows the configuration of the second embodiment of the present invention.

FIG. 11 shows the configuration of the second embodiment of the present invention. In FIG. 11, the same reference numbers are used for the same components as in FIG. 9.

In this embodiment, besides the components shown in FIG. 9, an STS1/DS3 demultiplexer unit 214 for demultiplexing mapped DS3 signals from an STS1 signal, and a DS3/STS1 multiplexer unit 215 for multiplexing and converting DS3 signals into an STS1 signal are provided. An STS1 signal input from a SONET STS1 network is terminated by the STS1/DS3 demultiplexer unit 214. At this time, a detected high-order group alarm (in this case, the alarm of the STS1 signal) is reported to the DS1/VT1.5 multiplexer unit 204 as a DS1 alarm indication signal insertion signal. The terminated STS1 signal is demultiplexed and converted to DS3 signals, which are output to the DS3/DS2 demultiplexer unit 200. The processes in the DS3/DS2 demultiplexer unit 200 and after are the same as those in FIG. 9.

On the other hand, an STS1 signal input from a SONET network (SONET VT network supporting VT1.5 signals) is processed in the same way to the point where the STS1 signal is demultiplexed and converted to DS3 signals. The DS3 signals output by the DS2/DS3 multiplexer unit 211 are input to the DS3/STS1 multiplexer unit 215, and are multiplexed and converted to an STS1 signal, which is output to an STS1 network.

FIG. 12 shows the configuration of the interface apparatus of the third embodiment of the present invention.

In this embodiment, the memory unit of a VT1.5/DS1 demultiplexer unit 502 is operated by a clock signal from a clock generator unit for a DS3 network 505, and the memory has been deleted from a DS2/DS3 multiplexer unit 504, which should be prepared if the conventional technology is applied.

The interface apparatus 500 of this embodiment comprises an STS1/VT1.5 multiplexer unit 501 for inputting an STS1 signal from a SONET network and multiplexing and converting the STS1 signal to VT1.5 signals, a VT1.5/DS1 demultiplexer unit 502 for demultiplexing the VT1.5 signals into DS1 signals, a DS1/DS2 multiplexer unit 503 for multiplexing and converting the DS1 signals to DS2 signals, a DS2/DS3 multiplexer unit 504 for multiplexing and converting the DS2 signals to a DS3 signal, and a clock generator unit for a DS3 network 505.

In this embodiment, when a VT1.5 signal is demultiplexed and converted to DS1 signals, the VT1.5 signal is stored once in a memory (in the VT1.5/DS1 demultiplexer unit 502), the VT1.5 signals are read out using a clock signal synchronous with a clock for a DS3 network (clock frequency of an output signal, 44.736 MHz here, corresponding to a clock signal generated by a clock generator unit for a DS3 network 505), and DS1 signals are demultiplexed. The demultiplexed and converted DS1 signals are multiplexed and converted to DS2 signals as they are via a DS1/DS2 multiplexer unit 503 operated synchronized with a clock for a DS3 network.

Since when DS1 signals are extracted from VT1.5 signals, the DS1 signals are multiplexed and converted to DS2 signals, and then to a DS3 signal synchronized with a clock for a network (clock for a DS3 network), the DS2 signals are multiplexed and converted to a DS3 signal without using a memory. By changing a clock for a network to 51.84 Mbps using this method, the DS1 signals can be multiplexed and converted to a DS3 signal without using a memory in the same way, even when connecting an STS1 signal mapped by a DS3 signal. In the same way, the DS3 signals are multiplexed and converted to an STS1 signal without using a memory.

Saving a memory as described above has the advantage of simplifying the configuration of the interface apparatus and reducing the manufacturing cost.

Figure 13:
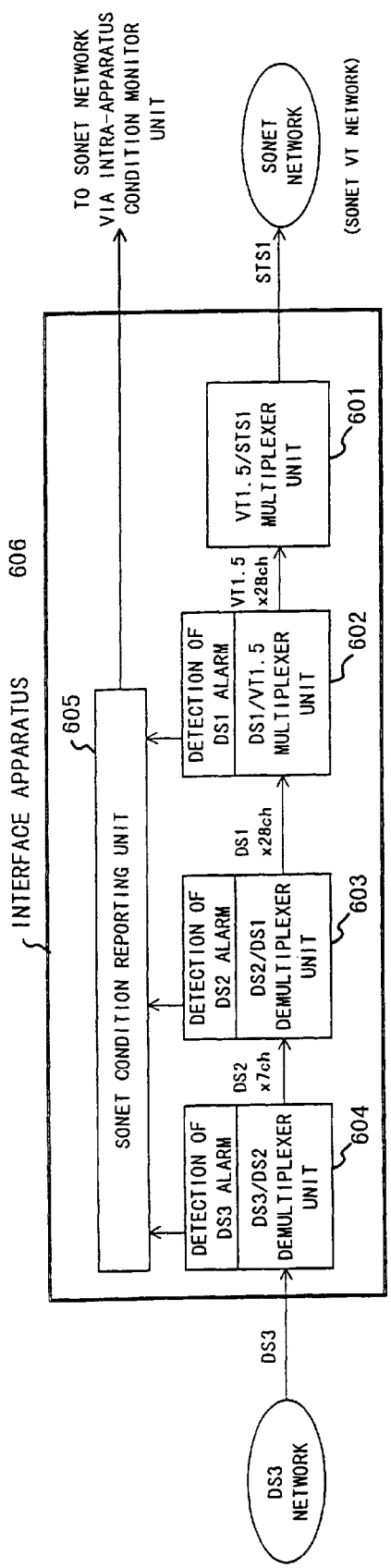
FIG. 13 shows the configuration of the fourth embodiment for monitoring an alarm of a DSn signal using the interface apparatus of the present invention.

FIG. 13 shows the configuration of the fourth embodiment for monitoring the alarm of a DSn signal using the interface apparatus of the present invention.

In this embodiment, the interface apparatus 606 comprises a DS3/DS2 demultiplexer unit 604 for demultiplexing and converting a DS3 signal to DS2 signals, a DS2/DS1 demultiplexer unit 603 for demultiplexing and converting the DS2 signals to DS1 signals, and a SONET condition reporting unit 605 for monitoring the condition of each signal, by which the condition of DS2 and DS1 signals can be monitored. A DS1/VT1.5 multiplexer unit 602 multiplexes and converts DS1 signals to VT1.5 signals, whereas a VT1.5/STS1 multiplexer unit 601 multiplexes and converts VT1.5 signals to an STS1 signal.

In this embodiment, a DS3 (44.736 Mbps) signal input from a DS3 network is terminated by the DS2/DS3 demultiplexer unit 604. At this moment, a detected DS3 alarm is reported to the SONET condition reporting unit 605 as a DS3 detection alarm. The terminated DS3 signal is demultiplexed and converted to 7 channels of DS2 signals, which are output to the DS2/DS1 demultiplexer unit 603. In the DS2/DS1 demultiplexer unit 603 7 channels of the input DS2 signals are terminated. At this time, detected DS2 alarms for the 7 channels are reported to the SONET condition reporting unit 605 as DS2 detection alarms. Each of the terminated DS2 signals are demultiplexed and converted to 4 channels of DS1 signals, and a total of 28 channels of DS1 signals are output. Then, the DS1 signals are input to the DS1/VT1.5 multiplexer unit 602. In the DS1/VT1.5 multiplexer unit 602, DS1 alarms are detected, which are reported to the SONET condition reporting unit 605 as a total of 28 channels of DS1 detection alarms. The detection alarms of the DS3, DS2 and DS1 signals reported to the SONET condition reporting unit 605 manage the alarms of all signals in the condition reporting unit 605, are sent to the intra-apparatus condition monitor unit of the interface apparatus of this embodiment, and are reported to a SONET network as intra-apparatus alarms.

Figure 14:
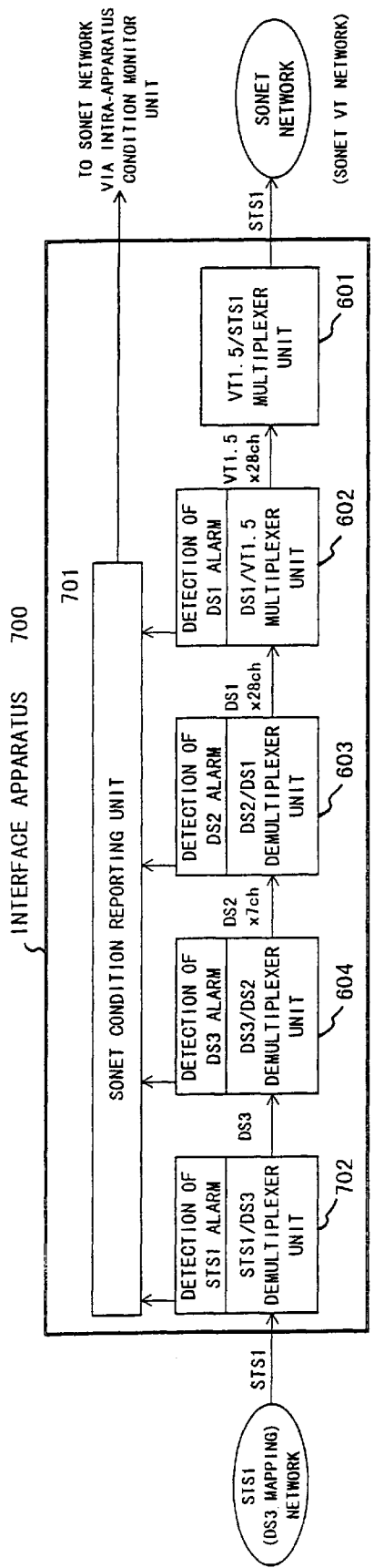
FIG. 14 shows the configuration of the fifth embodiment for monitoring alarms of the interface apparatus between a SONET STS1 network where a DS3 signal is mapped, and a SONET VT network.

FIG. 14 shows the configuration of the fifth embodiment for monitoring alarms of the interface apparatus between a SONET STS1 network where a DS3 signal is mapped, and a SONET VT network.

In this embodiment, even when a SONET STS1 signal mapped with a DS3 signal is connected to a SONET VT network, the same operations as in the fourth embodiment are performed. A SONET network and a network for an STS1 signal mapped by a DS3 signal are formed independently of each other, and when the STS1 signal network mapped by a DS3 signal is connected to a SONET network using a conventional apparatus, only information on a DSn signal at the contact point connected to the SONET network can be monitored.

In this embodiment, besides the above mentioned component units, an STS1/DS3 demultiplexer unit 702 for demultiplexing and converting the mapped DS3 signals from the STS1 signal is provided. An STS1 signal input from a SONET STS1 network is terminated by the STS1/DS3 demultiplexer unit 702. At this time, a detected higher-order group alarm (alarm of the STS1 signal) is reported to a SONET condition reporting unit 701 as an STS1 detection alarm. The terminated STS1 signal is demultiplexed and converted to DS3 signals, which are output to the DS3/DS2 demultiplexer unit 604. The processes in the DS3/DS2 demultiplexer unit 604 and after are the same as those shown in FIG. 13.

The STS1 alarms, DS3 alarms, DS2 alarms and DS1 alarms collected in the SONET condition reporting unit 701 are sent to the intra-apparatus condition monitor unit (not shown in the drawing), and are sent to a SONET network as intra-apparatus alarms.

Figure 15:
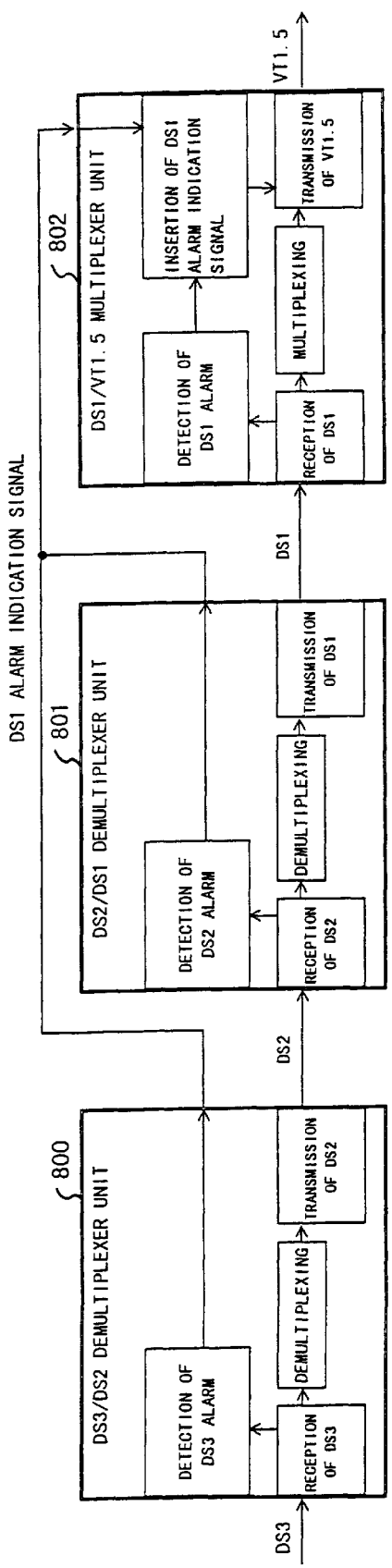
FIG. 15 shows the configuration of the sixth embodiment of the present invention.

FIG. 15 shows the configuration of the sixth embodiment of the present invention.

This embodiment comprises a DS3/DS2 demultiplexer unit 800, a DS2/DS1 demultiplexer unit 801, and a DS1/VT1.5 multiplexer for inserting DS3 and DS2 detection alarms detected by the DS2/DS1 demultiplexer unit 801 in a DS1 signal, as an alarm indication signal, by which the process of detecting alarms is simplified, and the circuitry scale is reduced.

In this embodiment, although the detection alarm of a DS3 signal is detected by the DS3/DS2 demultiplexer unit 800, the detection alarm is inserted by the DS1/VT1.5 multiplexer unit 802 not in a DS2 signal demultiplexed and converted from the DS3 signal, but in a DS1 signal demultiplexed and converted from the DS3 signal as an alarm indication signal of the DS3 signal. Although usually the alarm of a DS3 signal as a higher-order group alarm has to be inserted as an alarm indication signal in a DS2 signal, in this embodiment, the process of inserting an alarm indication signal in a DS2 signal can be replaced with the process of inserting an alarm indication signal in a DS1 signal being the lowest-order group, since the object is to convert the DS3 signal to a VT1.5 signal, and the DS3 signal is demultiplexed and converted to DS2 signals, and then into DS1 signals in the same apparatus. In the same way, when the alarms in a DS2 signal are also detected by the DS2/DS1 demultiplexer unit 801, the alarms in the DS2 signal instead of a DS1 signal multiplexed and converted from the DS2 signal are inserted by the DS1/VT1.5 multiplexer unit 802 in a DS1 signal demultiplexed and converted from the DS2 signal as alarm indication signals for a DS1 signal.

Figure 16:
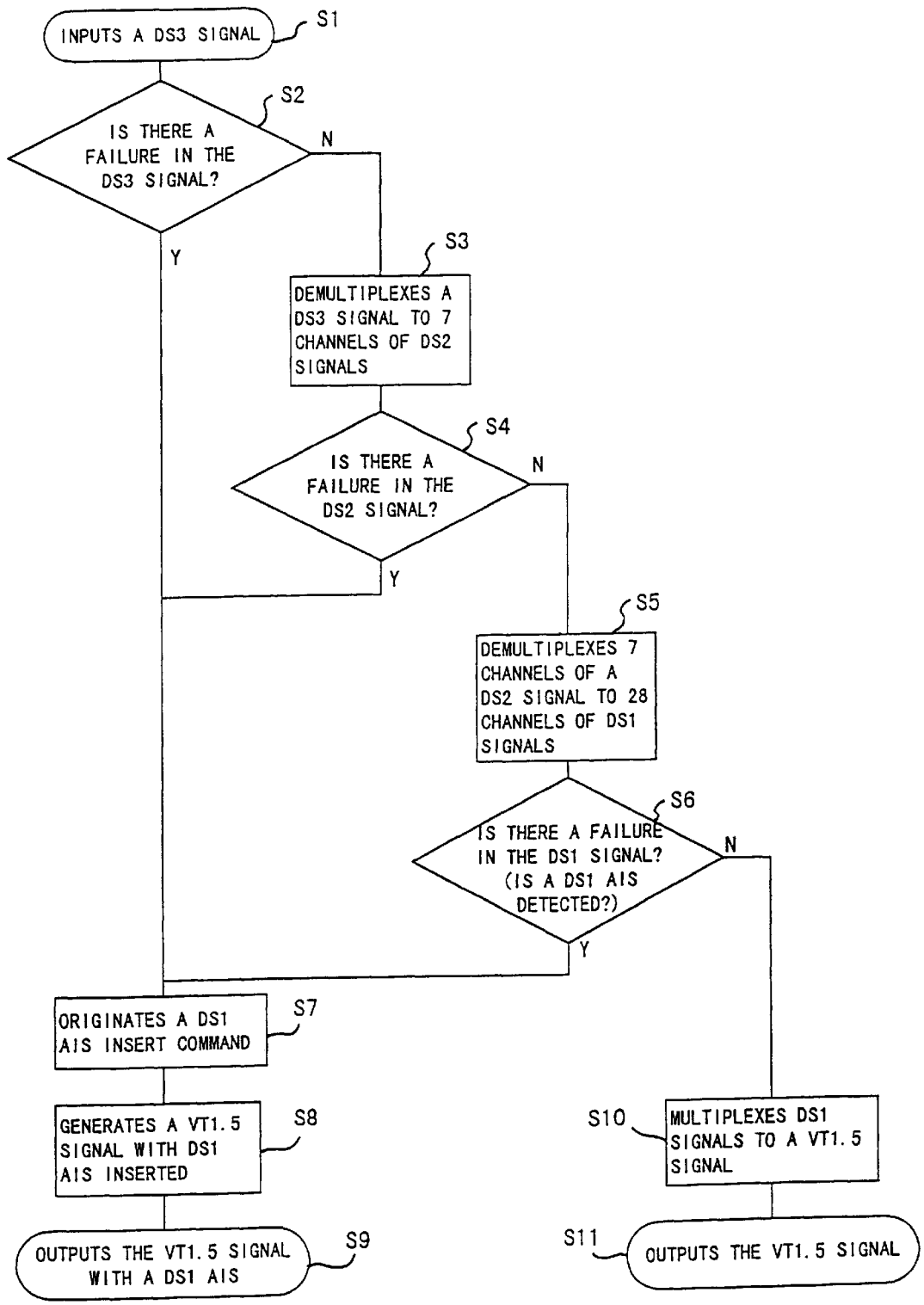
FIG. 16 is a flowchart showing the entire process of the interface apparatus shown in FIG. 15.

FIG. 16 is a flowchart showing the entire process of the interface apparatus shown in FIG. 15.

First, when a DS3 signal is input to a DS3/DS2 demultiplexer unit 800 (step S1), in step S2 it is judged whether or not there is a failure in the DS3 signal. If there is a failure, a DS1 AIS insert command is originated from the DS3/DS2 demultiplexer unit 800 to a DS1/VT1.5 multiplexer unit 802 (step S7). When the DS1/VT1.5 multiplexer unit 802 receives this insert command, in step S8 a VT1.5 signal with a DS1 AIS inserted is generated, which is output in step S9.

If it is judged in step S2 that there is no failure in the DS3 signal, the DS3 signal is demultiplexed and converted to 7 channels of DS2 signals in the DS3/DS2 demultiplexer unit 800 (step S3). The demultiplexed and converted DS2 signals are received by a DS2/DS1 demultiplexer unit 801, and it is checked whether there is a failure in the DS2 signals (step S4). If a failure is detected in the DS2 signals, as described above, the processes of steps S7 to S9 are executed, and a VT1.5 signal with the DS1 AIS is generated and output from the DS1/VT1.5 multiplexer unit 802.

If no failure is detected in the DS2 signals in step S4, the flow proceeds to step S5, 7 channels of the DS2 signals are demultiplexed and converted to 28 channels of DS1 signals in the DS2/DS1 demultiplexer unit 801, which are transmitted to the DS1/VT1.5 multiplexer unit 802. In the DS1/VT1.5 multiplexer unit 802 it is detected whether or not there is a failure in the DS1 signals (step S6). If a failure is detected, the processes of steps S7 to S9 are executed, and a VT1.5 signal with the DS1 AIS is generated and output.

If no failure is detected in the DS1 signals in step S6, in step S10 the DS1 signals are multiplexed and converted to a VT1.5 signal, which is output in step S11. In this case, since this means that there is no failure in any signal level, the VT1.5 signal generated in step S10 has no alarm information.

Figure 17:
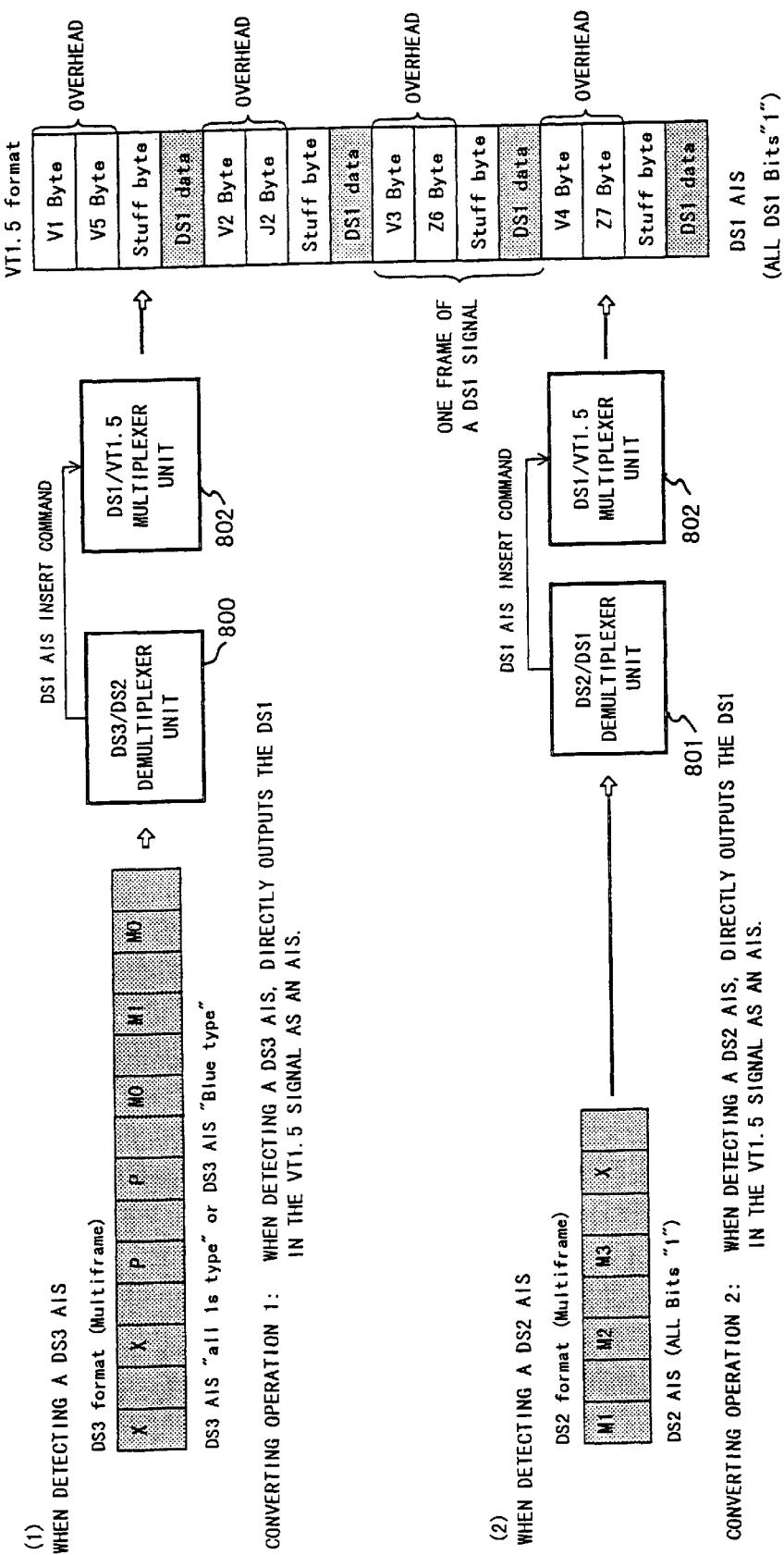
FIG. 17 explains the change of the data format of the interface apparatus of the embodiment shown in FIG. 15.

FIG. 17 explains the change of the data format of the interface apparatus of the embodiment shown in FIG. 15.

Part (1) of FIG. 17 shows the case where the AIS of a DS3 signal is detected. As shown in the drawing, the format of the DS3 signal is of the multiframe type, and "X", "P", "M0" and "M1" in the drawing represent the overhead part of the DS3 signal. In the case of a DS3 signal two kinds of alarm can be considered; one is an alarm in which all data are rewritten as "1s", and the other is an alarm called a blue type. This alarm information are detected in the DS3/DS2 demultiplexer unit 800, and a DS1 AIS insert command is transmitted to the DS1/VT1.5 multiplexer unit 802. In the DS1/VT1.5 multiplexer unit 802 the signals are converted to a format of the VT1.5 signal such as shown on the right side of FIG. 17, and are sent out. At this moment, the alarm indication signal of a DS1 signal is inserted in the DS1 signal corresponding to the alarm of the DS3 signal, and all the contents of the corresponding DS1 data are rewritten as "1s".

Part (2) of FIG. 17 shows the case where the alarm of a DS2 signal is detected in a DS2/DS1 demultiplexer unit 801.

Although a DS2 format is as shown in the drawing, and is also of the multiframe type, reflecting that the signal speed of the DS2 signal is slower than that of a DS3 signal, the frame of the format of the DS2 signal is shorter than that of a DS3 format.

In the format of the DS2 signal too, all of "M1", "M2", "M3" and "X" represent the overhead part of the DS2 signal.

Since all the alarm (AIS) data of the DS2 signal are replaced with "1s", all the data of a corresponding payload are rewritten as "1s" if there is an alarm in the overhead. When an alarm is detected in the DS2/DS1 demultiplexer unit 801, a DS1 AIS insert command is issued to a DS1/VT1.5 multiplexer unit 802, all the data of the payload corresponding to the data with the AIS are rewritten as "1s", and a VT1.5 signal is generated.

The format of a VT1.5 signal is as shown on the right side of FIG. 17, and four frames of DS1 signals are accommodated in one VT1.5 signal. The frame of each DS1 signal consists of an overhead part, a stuff byte part and data carried by the DS1 signal. Out of the DS1 signal data, all the DS1 data part of the VT1.5 format of data corresponding to the alarm detected by a DS3/DS2 demultiplexer unit 800 or DS2/DS1 demultiplexer unit 801 are replaced with "1s".

Alarm detection is carried out even in the DS1 signal level in the DS1/VT1.5 multiplexer unit 802, though this is not shown in FIG. 17. Therefore, when an alarm (AIS) is detected in the DS1 signal level, all corresponding data are rewritten by "1s" even if there is no alarm in the DS3 signal or DS2 signal level.

Figure 18:
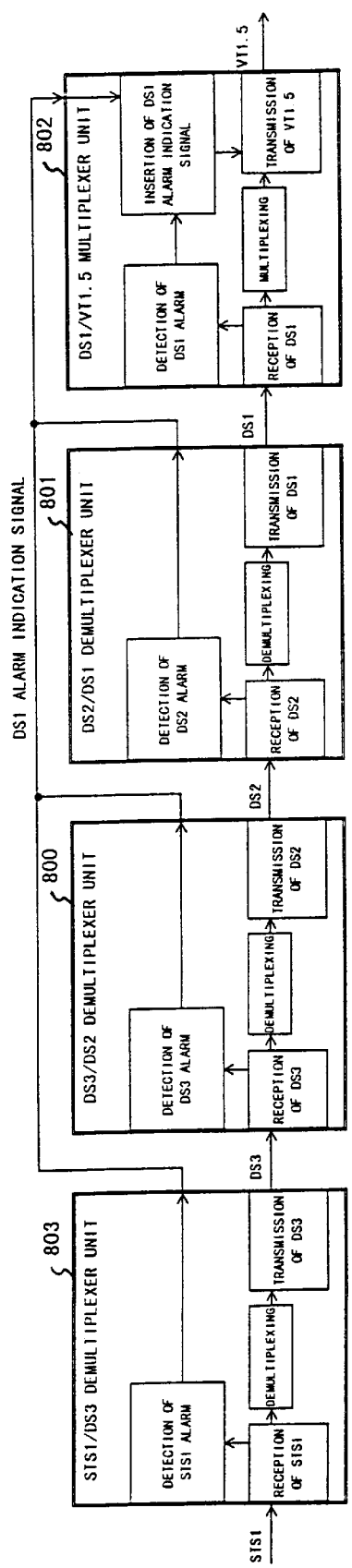
FIG. 18 shows the configuration of the seventh embodiment where an STS1 signal into which a DS3 signal is mapped is converted to a VT1.5 signal.

FIG. 18 shows the configuration of the seventh embodiment where an STS1 signal into which DS3 signals are mapped is converted to a VT1.5 signal.

In this embodiment, in addition to the configuration shown in FIG. 15, an STS1/DS3 demultiplexer unit 803 is provided, by which a stage for demultiplexing and converting an STS1 signal to DS3 signals is provided. The other units with the same reference numbers as in FIG. 15 operate in the same way as described earlier. In this way, in addition to a DS3 signal interfacing, the interface apparatus of this embodiment can provide services based on an STS1 signal into which the DS3 signals are mapped.

In this case too, although conventionally the apparatus is so configured that the alarm of an STS1 signal being a higher order group alarm is inserted in the DS3 signal as an alarm indication signal, in the present invention a route for inserting the STS1 detection alarm detected in the STS1/DS3 demultiplexer unit 803 as an alarm indication signal in the DS1/VT1.5 multiplexer unit 802 is provided, by which the detection alarm of the STS1 signal is detected in the STS1/DS3 demultiplexer unit 803, and the alarm of the STS1 signal is inserted in the DS1 signal demultiplexed from the STS1 signal in the DS1/VT1.5 multiplexer unit 802 as an alarm indication signal of the DS1 signal, without inserting the STS1 signal detection alarm in the DS3 signal demultiplexed and converted from the STS1 signal as an alarm indication signal of the DS3 signal.

Since it is an object of this embodiment to convert the STS1 signal to a VT1.5 signal, signals can be processed by inserting an alarm indication signal in the DS1 signal being the lowest order group without inserting an alarm indication signal in the DS3 signal.

Figure 19:
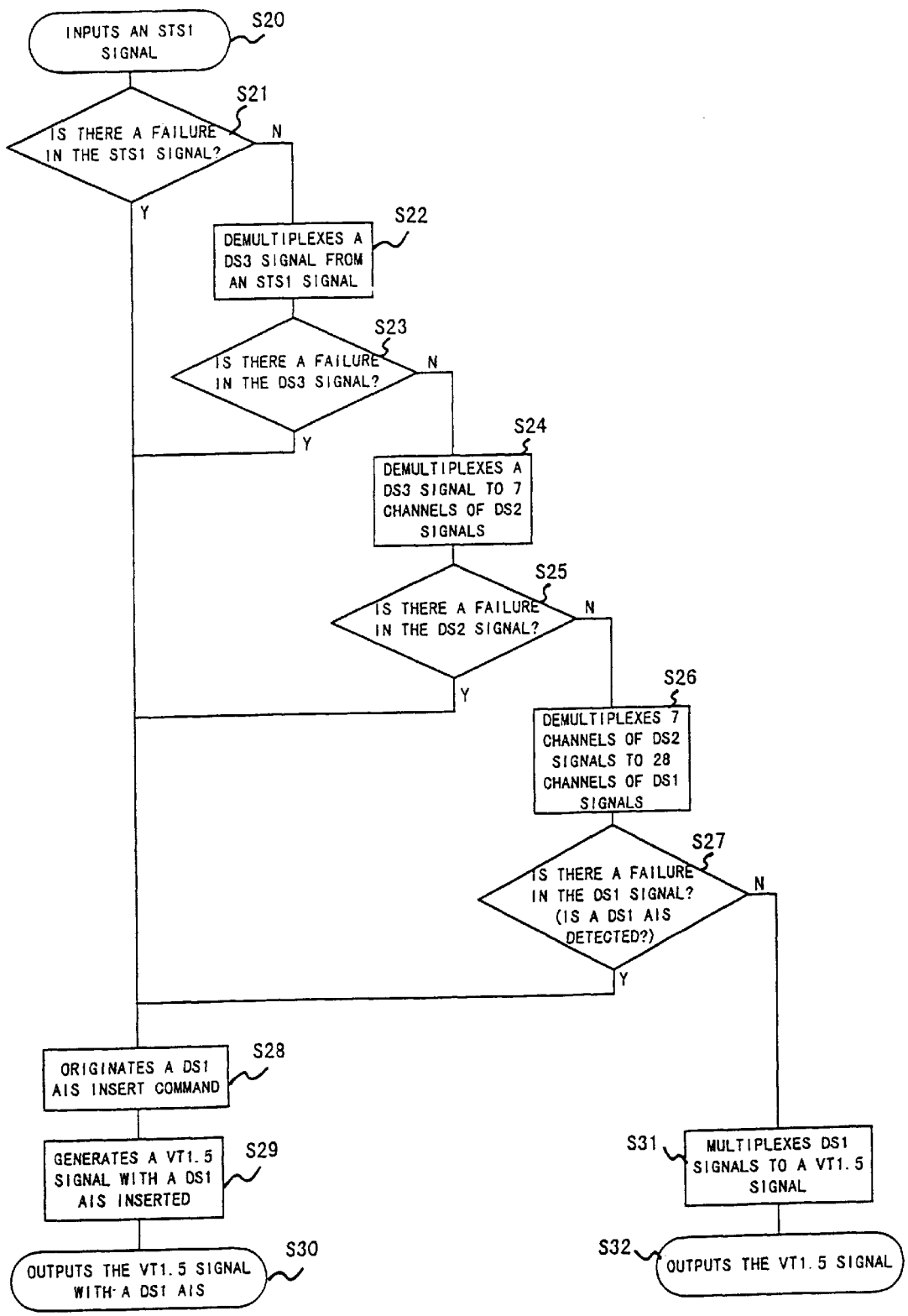
FIG. 19 is a flowchart showing the entire process of the interface apparatus shown in FIG. 18.

FIG. 19 is a flowchart showing the entire process of the interface apparatus shown in FIG. 18.

When in step S20 an STS1 signal is input to an STS1/DS3 demultiplexer unit 803, by detecting an alarm signal in the STS1/DS3 demultiplexer unit 803 it is judged whether or not there is a failure in the STS1 signal(step S21). If there is a failure in the STS1 signal, in step S28 a DS1 AIS insert command is transmitted to a DS1/VT1.5 multiplexer unit 802. When the DS1/VT1.5 multiplexer unit 802 receives this command, a VT1.5 signal with a DS1 AIS inserted is generated in the DS1/VT1.5 multiplexer unit 802 (step S29), which is output (step S30).

If in step S21 it is judged that there is no failure in the STS1 signal, the DS3 signals are demultiplexed and converted from the STS1 signal in the STS1/DS3 demultiplexer unit 803 (step S22). Then, the DS3 signals are transmitted to a DS3/DS2 demultiplexer unit 800. In the DS3/DS2 demultiplexer unit 800, by checking the alarm signals of the DS3 signals, it is judged whether or not there is a failure in the DS3 signals (step S23). If there is a failure, the processes of the before-mentioned steps S28 to S30 are executed.

If in step S23 it is judged that there is no failure in the DS3 signals, the DS3 signals are demultiplexed and converted to 7 channels of DS2 signals in the DS3/DS2 demultiplexer unit 800 (step S24), which are transmitted to a DS2/DS1 demultiplexer unit 801. In the DS2/DS1 demultiplexer unit 801, it is judged whether or not there is a failure in the DS2 signals (step S25). If there is a failure, in the same way as described before, a DS1 AIS insert command is issued to the DS1/VT1.5 multiplexer unit 802, and the processes of steps S29 and S30 are executed.

If in step S25 it is judged that there is no failure, 7 channels of the DS2 signals are demultiplexed and converted to 28 channels of DS1 signals in the DS2/DS1 demultiplexer unit 801 (step S26), which are transmitted to the DS1/VT1.5 multiplexer unit 802.

In the DS1/VT1.5 multiplexer unit 802 it is judged whether or not there is a failure in the DS1 signals (step S27). If there is a failure in the DS1 signals, the processes of steps S28 to S30 are executed.

If in step S27 it is judged that there is no failure in the DS1 signals, in step S31 the DS1 signals are multiplexed and converted to a VT1.5 signal, which is sent out in step S32. This VT1.5 signal does not include alarm information.

Figure 20:
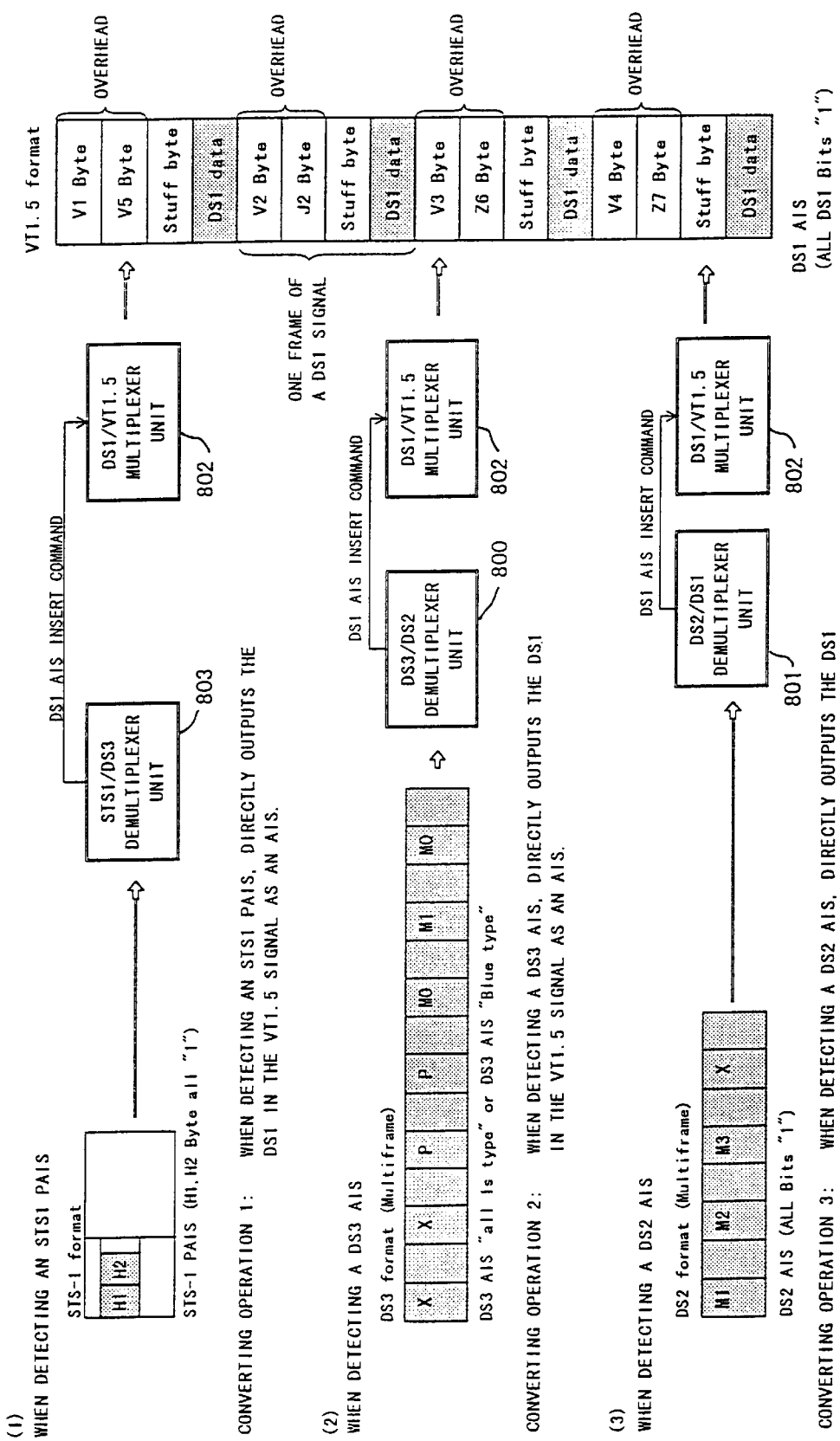
FIG. 20 shows the change of the data format accompanied by the process of the interface apparatus of the embodiment shown in FIG. 18.

FIG. 20 shows the change of the data format accompanied by the process of the interface apparatus of the embodiment shown in FIG. 18.

As shown in part (1) of FIG. 20, when a signal with an STS1 format is input to an STS1/DS3 demultiplexer unit 803, the signals of "H1" and "H2" bytes of the overhead part are checked, and it is judged whether or not all these bytes are set to "1s". If all bytes called "H1" and "H2" are set to "1s", it means there is a failure in the STS1 signal. Accordingly, a DS1 AIS insert command is issued from the STS1/DS3 demultiplexer unit 803 to a DS1/VT1.5 multiplexer unit 802.

On the other hand, part (2) of FIG. 20 shows the case where DS3 signals demultiplexed and converted in the STS1/DS3 demultiplexer unit 803 are input to a DS3/DS2 demultiplexer unit 800. The format shown here is the same as that shown in FIG. 10. If the AIS of the DS3 signals represents a failure, a DS1 AIS insert command is issued from the DS3/DS2 demultiplexer unit 800 to the DS1/VT1.5 multiplexer unit 802.

Part (3) of FIG. 20 shows the case where DS2 signals demultiplexed and converted in the DS3/DS2 demultiplexer unit 800 include an alarm. In this case, this alarm is detected by a DS2/DS1 demultiplexer unit 801, and the DS2/DS1 demultiplexer unit 801 issues a DS2 AIS insert command to the DS1/VT1.5 multiplexer unit 802.

In either of the cases, when receiving the DS1 AIS insert command, the DS1/VT1.5 multiplexer unit 802 sets all corresponding DS1 data to "1", and generates a VT1.5 signal. The VT1.5 format shown on the right side of the drawing is the same as that shown in FIG. 10. One VT1.5 frame consists of four DS1 frames, and each DS1 frame comprises a overhead part, a stuff byte part and a data part.

FIG. 21 shows the configuration of the interface apparatus of the eighth embodiment of the present invention.

The interface apparatus shown in the drawing is an apparatus for interfacing a network using an STS1 signal to a DS2 network, which comprises an STS1/VT1.5 demultiplexer unit 1000 for demultiplexing and converting an STS1 signal to VT1.5 signals, a VT1.5/DS1 demultiplexer unit 1001 for demultiplexing and converting VT1.5 signals to DS1 signals, and a DS1/DS2 multiplexer unit 1002 for multiplexing and converting DS1 signals to a DS2 signal.

In this embodiment, a route by which the detected alarms of both STS1 and VT1.5 detected by the STS1/VT1.5 demultiplexer unit 1000 and VT1.5/DS1 demultiplexer unit 1001, respectively, are inserted in DS1 signals as alarm indication signals in the DS1/DS2 multiplexer unit 1002, is provided, and the alarm of the STS1 signal is inserted in the DS1 signals demultiplexed and converted from the STS1 signal, as the alarm indication signal of the DS1 signals, without inserting the detection alarm of the STS1 signal in the VT1.5 signals demultiplexed and converted from the STS1 signal, as the alarm indication signal of the VT1.5 signals. By inserting an alarm indication signal in the DS1 signals the signals can be processed without the process of inserting an alarm indication signal in the VT1.5 signals. In the same way, when multiplexing and converting the DS1 signals to a DS2 signal, a DS1 alarm indication signal is inserted in the DS2 signal in the DS1/DS2 multiplexer unit 1002 without inserting the detection alarm of the VT1.5 signals obtained from the VT1.5/DS1 demultiplexer unit 1001 without inserting the alarm signal in the DS1 signals demultiplexed from the VT1.5 signal, as the alarm indication signal of the DS1 signals.

Figure 22:
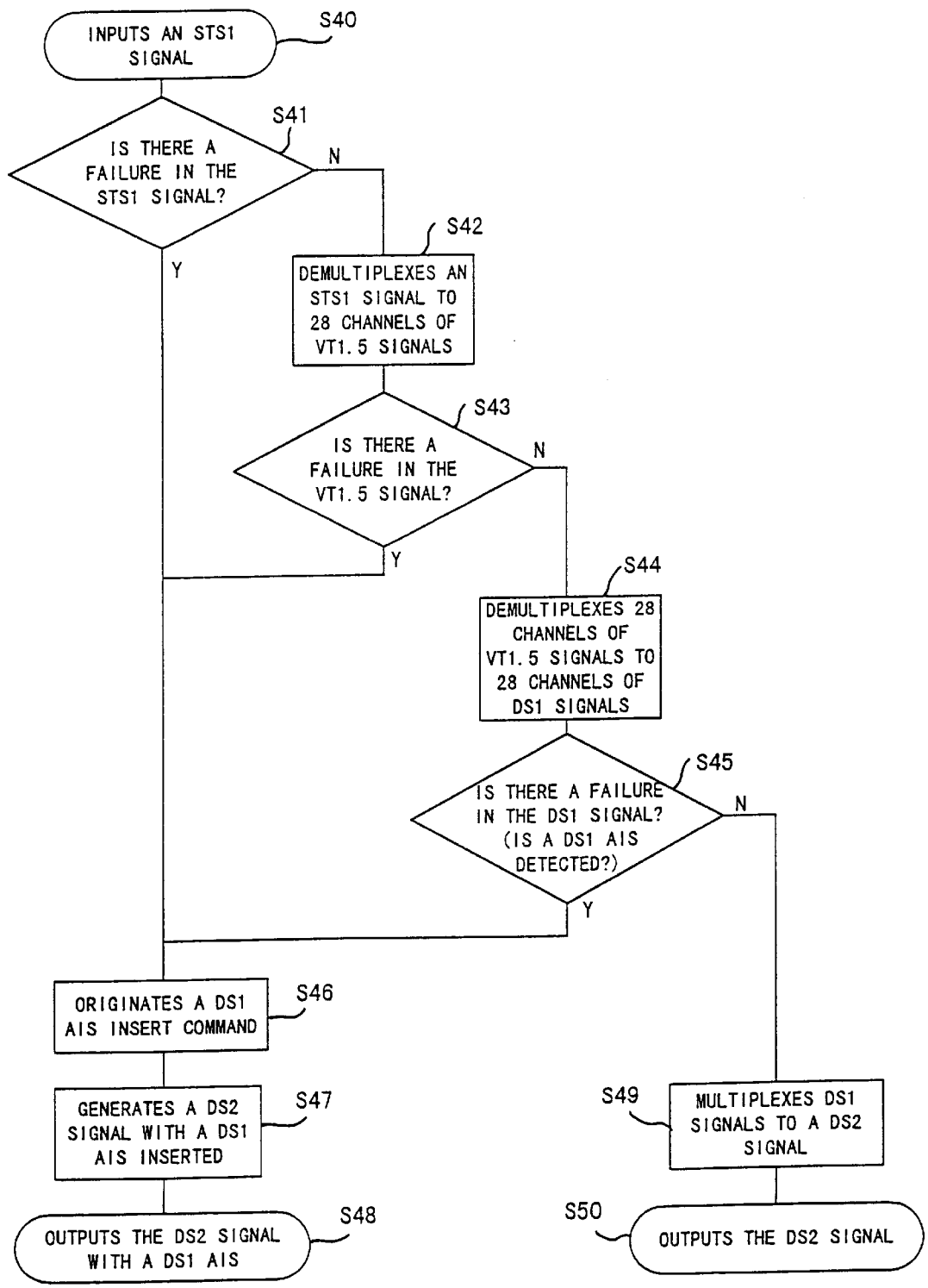
FIG. 22 is a flowchart showing the entire process of the interface apparatus of the embodiment shown in FIG. 21.

FIG. 22 is a flowchart showing the entire process of the interface apparatus of the embodiment shown in FIG. 21.

First, when in step S40 an STS1 signal is input to an STS1/VT1.5 demultiplexer unit 1000, the alarm signal of the STS1 signal is checked, and it is judged whether or not there is a failure in the STS1 signal (step S41). If there is a failure, the flow proceeds to step S46, where a DS1 AIS insert command is issued to a DS1/DS2 multiplexer unit 1002. When receiving this command, the DS1/DS2 multiplexer unit 1002 generates a DS2 signal with a DS1 AIS inserted (step S47), which is output (step S48).

If in step S41 it is judged that there is no failure in the STS1 signal, the STS1/VT1.5 demultiplexer unit 1000 demultiplexes and converts the STS1 signal to 28 channels of VT1.5 signals (step S42), and then transmits the signals to a VT1.5/DS1 demultiplexer unit 1001. By checking if there is an alarm signal, the VT1.5/DS1 demultiplexer unit 1001 judges whether or not there is a failure in the VT1.5 signals (step S43). If there is a failure, the processes of the before-mentioned steps of S46 to S48 are executed.

In step S43, if there is no failure in the VT1.5 signals, the VT1.5/DS1 demultiplexer unit 1001 demultiplexes and converts 28 channels of the VT1.5 signals to 28 channels of DS1 signals (step S44), and transmits the signals to the DS1/DS2 multiplexer unit 1002. The DS1/DS2 multiplexer unit 1002 checks if there is an alarm in the DS1 signals, and judges whether or not there is a failure in the DS1 signals (step S45). If there is a failure, the processes of the before-mentioned steps S46 to S48 are executed.

If in step S45 it is judged that there is no failure in the DS1 signals, in step S49 the DS1 signals are multiplexed and converted to a DS2 signal, which is output (step S50). The DS2 signal output in step S50 includes an alarm signal indicating that there is no failure.

Figure 23:
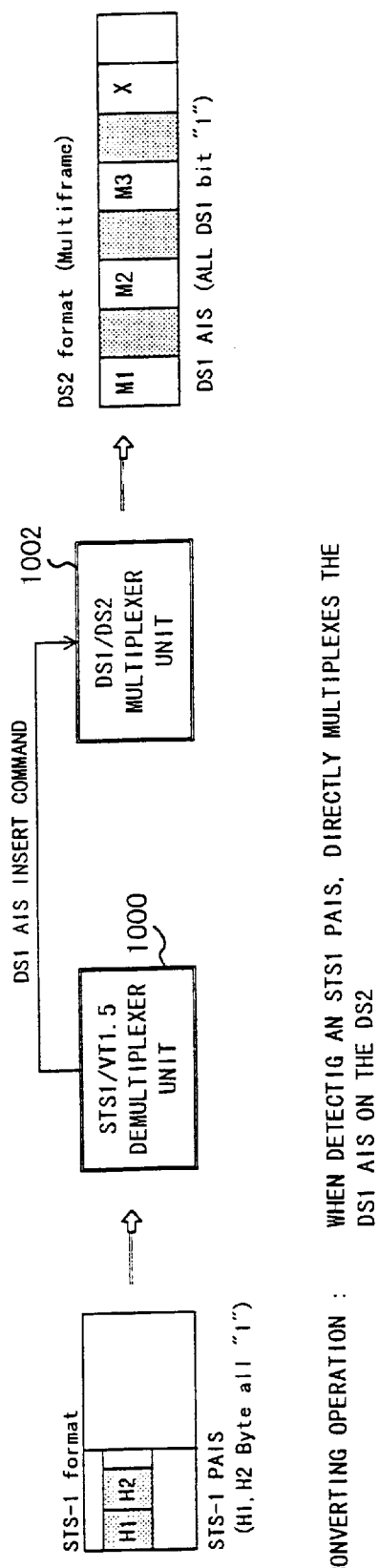
FIG. 23 shows the change of the data format of the embodiment shown in FIG. 21.

FIG. 23 shows the change of the data format of the embodiment shown in FIG. 21.

The format of an STS1 signal input to an STS1/VT1.5 demultiplexer unit 1000 is shown on the left side of the drawing. As described before, the alarm signal (PAIS) of the STS1 signal is recorded in a byte represented by "H1" and "H2" in the overhead part of an STS1 format, by detecting the states of these bytes, it can be judged whether or not there is a failure.

If both "H1" and "H2" are set to "1s", it is judged that there is a failure. This is reported to a DS1/DS2 multiplexer unit 1002 as a DS1 AIS insert command. When multiplexing and converting DS1 signals to a DS2 signal after receiving this command, the DS1/DS2 multiplexer unit 1002 sets all data of the DS1 signals to "1s", corresponding to an STS1 signal in which there is a failure, and inserts a DS1 AIS in the DS2 format.

FIG. 24 explains a DS1 interface apparatus being the ninth embodiment of the present invention.

In this embodiment this apparatus comprises a DS1 digital data output unit 1100, a DS1 digital data input unit 1101 and a clock generator unit for DSn output 1102. By connecting the DS1 digital data extracted from a DSn network to the DS1 digital data input unit 1101 as they are without encoding a DS1 signal, by synchronizing the DS1 digital data with a clock signal generated by the clock generator unit for DSn output 1102, the process of DS1 signal conversion is simplified and the scale of the circuitry is reduced.

Figure 1:
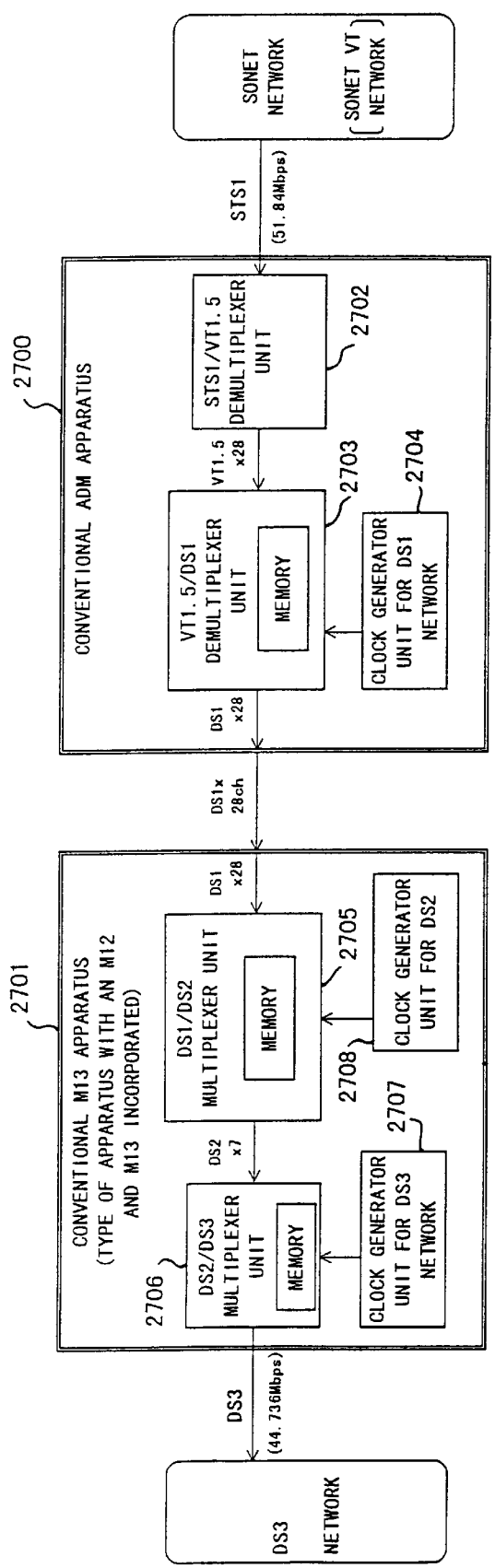
FIG. 1 shows the configuration in the case where DS3 signals can be connected to a SONET VT network by combining a conventional M13 apparatus and a conventional ADM apparatus.
Figure 2:
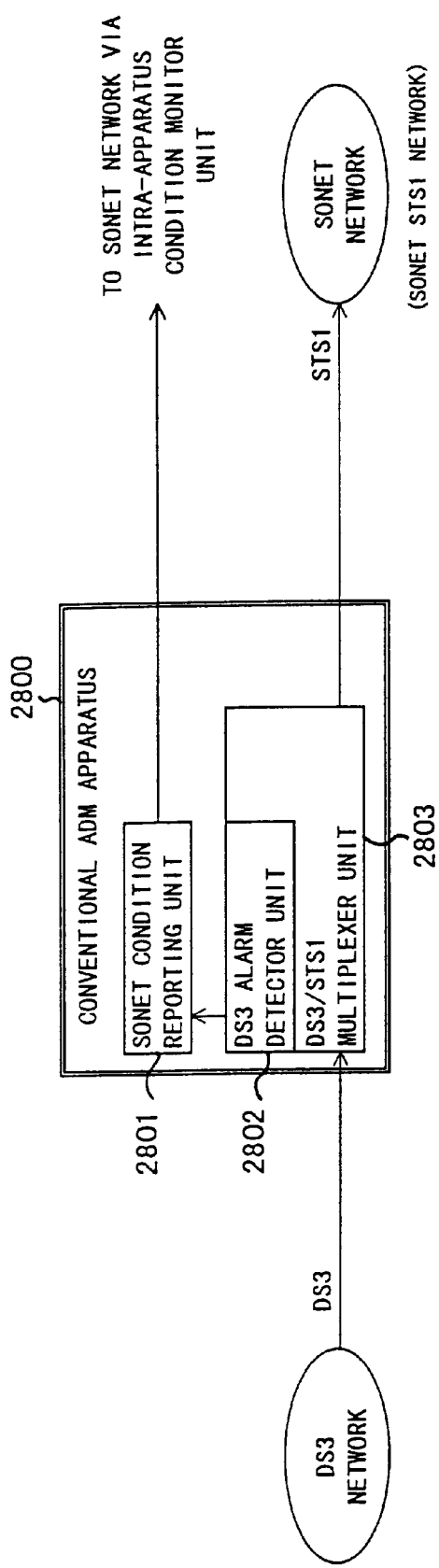
FIG. 2 shows the configuration of an apparatus in which a DS3 network is connected to a SONET network by using a conventional apparatus.
Figure 3:
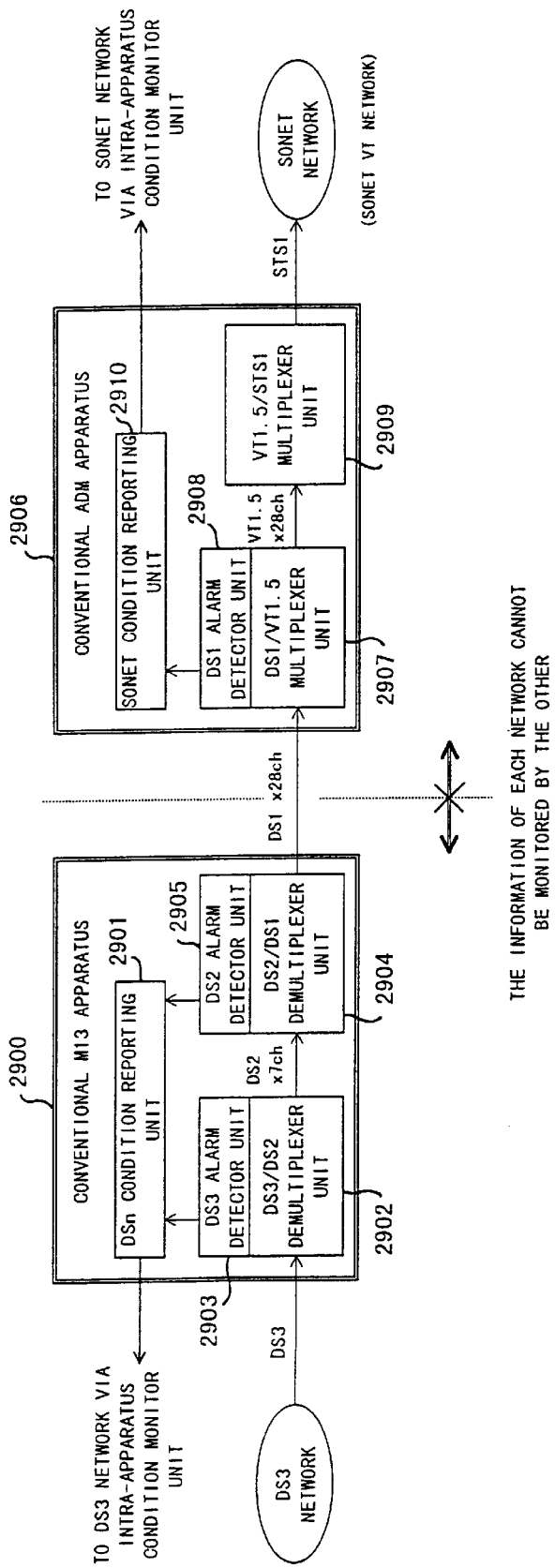
FIG. 3 shows the configuration in the case where a DS3 network is connected to a SONET VT network by combining a conventional M13 apparatus and a conventional ADM apparatus.
Figure 4:
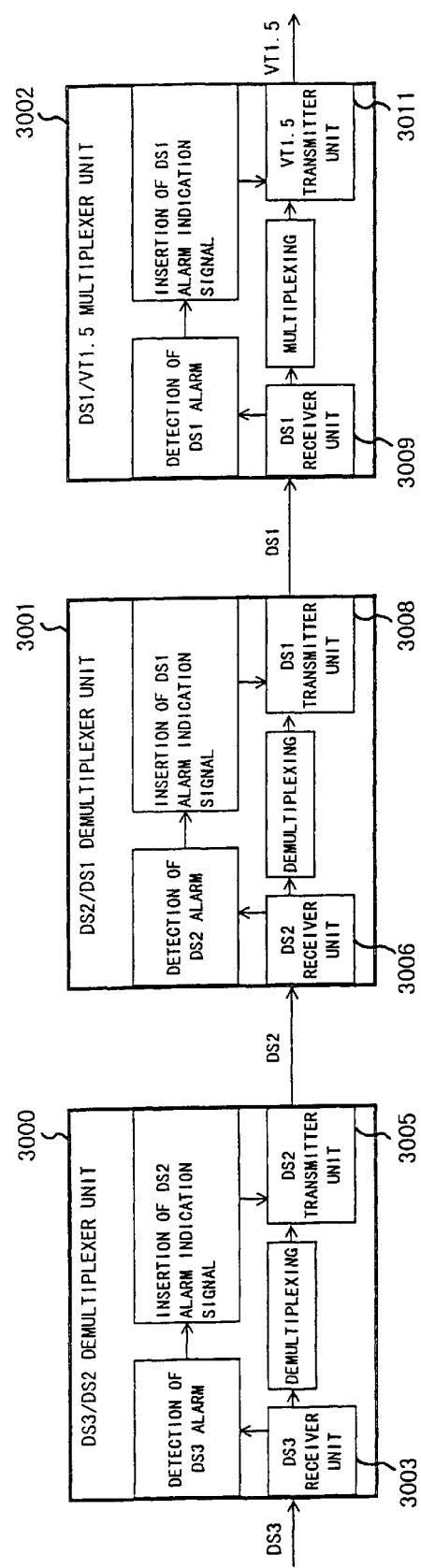
FIG. 4 explains a method of processing an alarm detected in each of signals DS3, DS2 and DS1 when converting a DS3 signal to a DS1 signal in a conventional apparatus.
Figure 5:
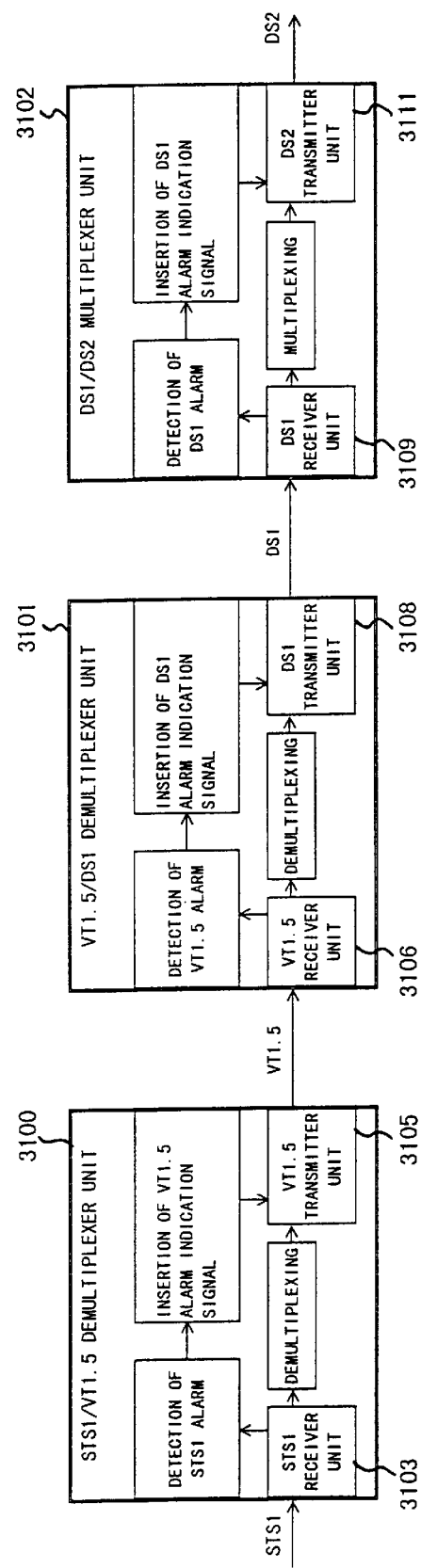
FIG. 5 explains the configuration in the case where a VT1.5 signal is extracted from an STS1 signal and is converted to a DS1 signal when connecting a SONET network to a DS3 network (44.736 Mbps) in a conventional apparatus.
Figure 6:
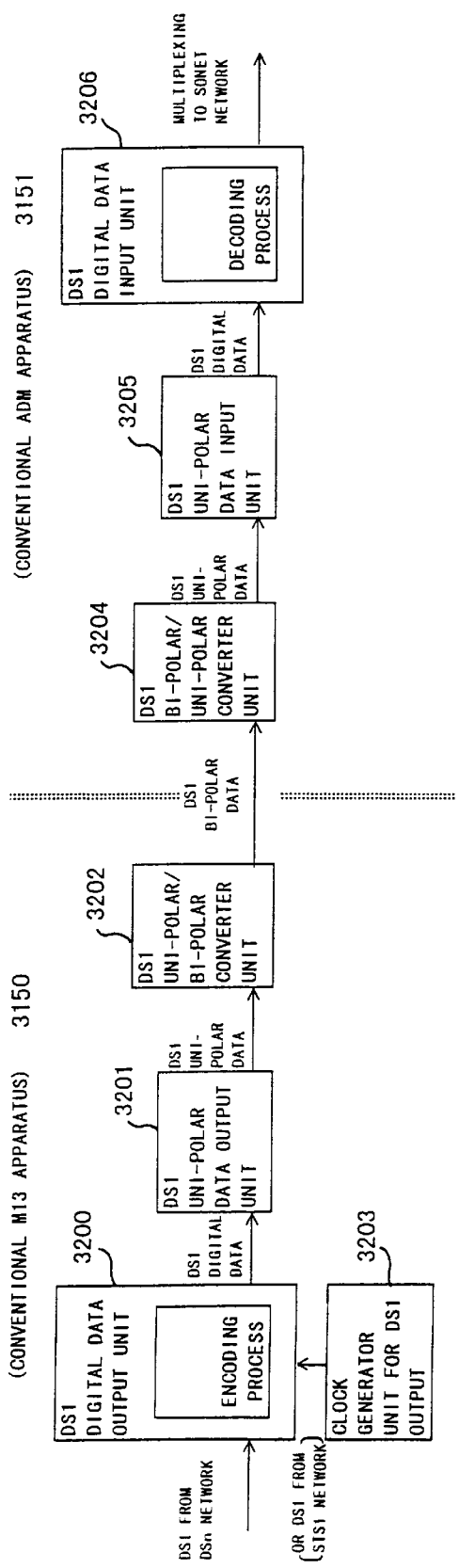
FIG. 6 shows the configuration of a conventional DS1 interface apparatus.
Figure 7:
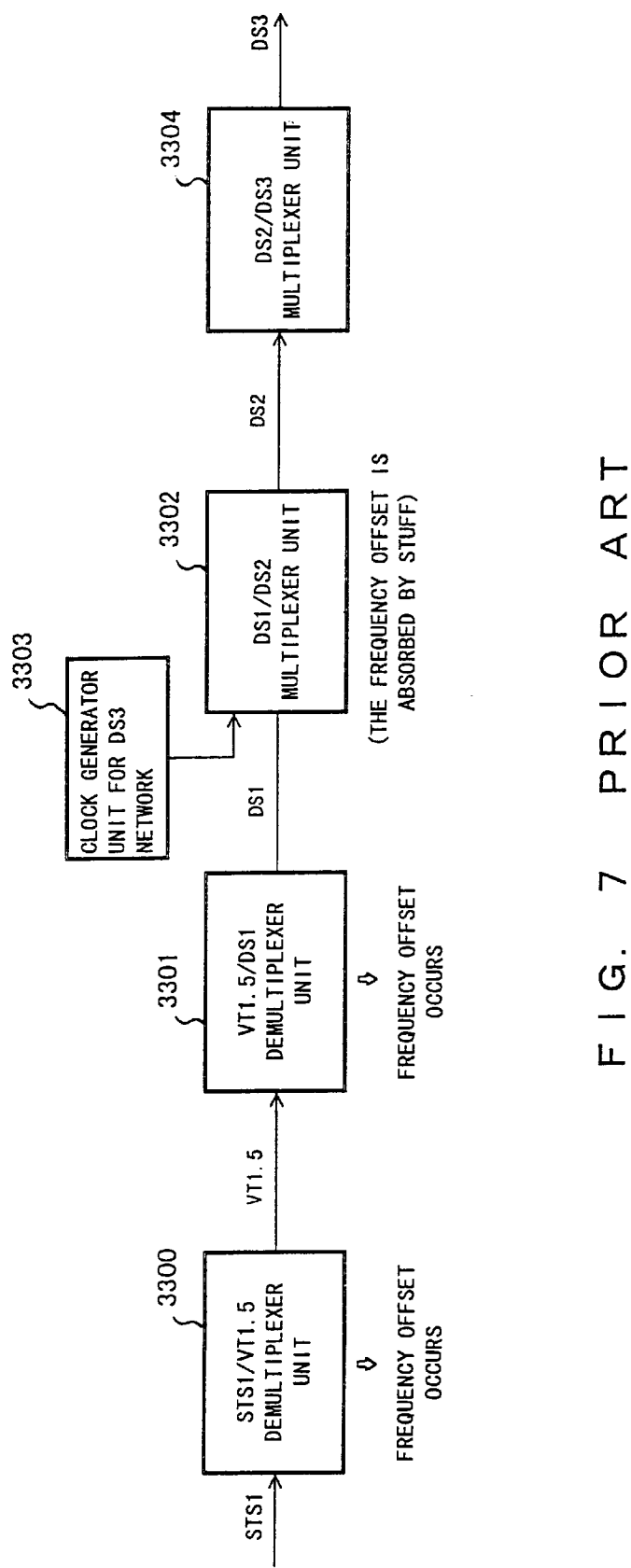
FIG. 7 explains the problems of a conventional STS1/DS3 converter apparatus.

In this embodiment, different from the prior art shown in FIG. 6, the DS1 digital data extracted from a DSn network are output to the DS1 digital data input unit 1101 as they are without encoding the DS1 signal, and converting the DS1 signal to a bi-polar signal by synchronizing the DS1 signal with the clock signal generated by the clock generator unit for DSn output 1102 , in the DS1 digital data output unit 1100. In the conventional apparatus shown in FIG. 6, the DS1 digital data are encoded and converted to a bi-polar signal, are transmitted, and are received and converted to a uni-polar signal and decoded. On the other hand, in this embodiment of the present invention, signals in the middle of conversion are kept within the apparatus by processing all signal conversions within one apparatus. For this reason, DS1 signals generated during signal conversion can be converted to DS2 signals, and then to VT1.5 signals within the apparatus, different from the conventional apparatus as shown in FIG. 6. Accordingly, the processes of encoding the DS1 digital data and converting the data to a bi-polar signal which are usually carried out outside the apparatus have become unnecessary, and the DS1 digital data can be transmitted and received as they are.

Figure 25:
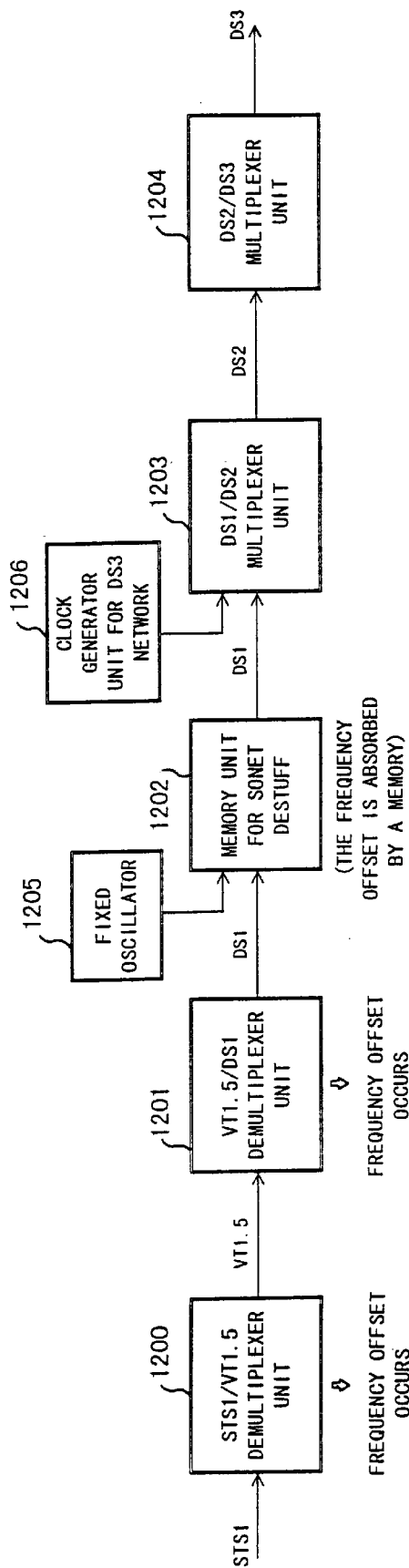
FIG. 25 shows the configuration of jitter compensation in the ninth embodiment of the present invention.

FIG. 25 shows the configuration of the jitter compensation of the ninth embodiment of the present invention.

In this embodiment, in order to avoid signal errors due to jitters caused by frequency off-set, a memory unit for SONET destuff 1202 for absorbing a frequency off-set generated in the destuffing process and a fixed oscillator 1205 for smoothing data are provided in the latter stage of a VT1.5/DS1 demultiplexer unit 1201 for demultiplexing and converting DS1 signals from VT1.5 signals, when an STS1 signal is converted to VT1.5 signals, and then to DS1 signals.

In this embodiment, an STS1 signal extracted from a SONET network is terminated by an STS1/VT1.5 demultiplexer unit 1200. The terminated STS1 signal is demultiplexed and converted to VT1.5 signals, which are output to the VT1.5/DS1 demultiplexer unit 1201. The VT1.5/DS1 demultiplexer unit 1201 terminates the VT1.5 signals, and demultiplexes and converts the VT1.5 signals to DS1 signals. At this moment, frequency off-set occurs. This is because signals made by removing an overhead part from the frame of the STS1 signal or VT1.5 signals are generated as DS1 signals as they are. Then, the VT1.5/DS1 demultiplexer unit 1201 outputs the demultiplexed and converted DS1 signals to the memory unit for SONET destuff 1202. In the memory unit for SONET destuff 1202, although the frequency off-set generated by the stuff bit when destuffing in demultiplexing and converting the STS1 signal to VT1.5 signals is stored in the DS1 signals, as shown in FIG. 10, the DS1 signals are smoothed and the frequency off-set is absorbed. The smoothed DS1 signals are multiplexed and converted to DS2 signals synchronized with the clock signal generated by a clock generator unit for the DS3 network 1206, and the DS2 signals are further multiplexed and converted to a DS3 signal by a DS2/DS3 multiplexer unit 1204, which is then output to a DS3 network. Thus, the frequency off-set generated when converting the STS1 signal of a SONET network to a DSn signal can be absorbed.

Although so far an apparatus capable of entering a SONET VT network where multiplexing and demultiplexing can be processed in units of VT1.5 while operating a DS3 network, is not realized, according to the present invention, a DS3 signal in the North America asynchronous DS3 network can be connected to a SONET VT network capable of multiplexing and demultiplexing in units of VT1.5 using one apparatus, and entering the SONET VT network from the DS3 network using one apparatus, has become possible.

Thus, an apparatus capable of entering a SONET VT network where multiplexing and demultiplexing can be processed in units of VT1.5 during operation, has been implemented.

In the present invention, since all memories for the 7 channels of DS2 signals needed to multiplex and convert DS2 signals to a DS3 signal when multiplexing and converting the DS2 signals to the DS3 signal, can be deleted, the circuit scale can be greatly reduced and the power consumption can be reduced compared with the conventional method.

In the conventional method, when interfacing to a DS3 network for services supporting a SONET VT network, in the SONET network only information of a DSn signal at the contact point connected to the SONET network can be monitored, and for the alarms of the DS3, DS2 and DS1 signals in the DS3 network, only the DS3 signal or DS1 signal at the contact point can be monitored.

However, if the present invention is adopted, even when a DS3 signal is connected to a SONET network, the condition of not only the DSn signal at the contact point of the DS3 network, but also all of the DS3, DS2 and DS1 signals in the DS3 network which cannot be conventionally monitored, can be monitored in the SONET network.

Insertion circuits for inserting the necessary alarm indication signals in each signal form needed when the conventional method is used, and a system which is configured to use a conventional M13 apparatus and ADM apparatus in converting a DS3 signal to DS2 signals, and then to a DS1 signal, converting an STS1 signal to DS3 signals, then to DS2 signals, and then to a DS1 signal, and converting an STS1 signal to a VT1.5 signal, can be deleted by adopting the present invention. When converting a DS3 signal to DS2 signals and then, to a DS1 signal, insertion circuits for 7 channels of the DS2 signals and 28 channels of DS1 signals can be deleted by adopting the present invention. Even when converting an STS1 signal to DS3 signals, then to DS2 signals and then to a DS1 signal, insertion circuits for one channel of the DS3 signal, 7 channels of the DS2 signals and 28 channels of the DS1 signals, can be deleted by adopting the present invention. When converting an STS1 signal to a VT1.5 signal, insertion circuits for 28 channels of VT1.5 signals and 28 channels of DS1 signals can be deleted by adopting the present invention. In this way, by adopting the present invention, the circuitry scale of the system can be greatly reduced.

By adopting the present invention, the six processes of an encoding process in a DS1 digital data output unit, a process of converting DS1 digital data to DS1 uni-polar data, a process of converting DS1 uni-polar data to DS1 bi-polar data, a process of converting DS1 bi-polar data to DS1 uni-polar data, a process of converting DS1 uni-polar data to DS1 digital data and a decoding process in a DS1 digital data input unit, and further a process for treating a total of 28 channels in the six processes needed when connecting a DS3 signal to a SONET VT network using a conventional ADM apparatus and a conventional M13 apparatus, can be omitted, and six kinds of signal processing circuits of encoding circuits, a DS1 digital/uni-polar conversion circuit, a DS1/bi-polar conversion circuit, a DS1 bi-polar/uni-polar conversion circuit, a DS1 uni-polar/digital conversion circuit and a DS1 decoding circuit, and a circuit for treating a total of 28 channels in the six circuits can be completely deleted. Accordingly, the circuitry scale can be greatly reduced and the increase of the power consumption can be suppressed.

In the conventional method, although when a lot of destuff processing occurs in a SONET signal in converting an STS1 signal to a DS1 signal, jitters due to frequency off-set in a destuff process cannot be absorbed by the stuff process of a DSn signal, and there is a possibility of causing a signal error, by adopting the present invention, jitters due to the frequency off-set generated when converting a SONET signal to a DSn signal can be suppressed, and a signal error can be prevented from occurring.

What is claimed is:

1. An interface apparatus for supporting the demultiplexing and multiplexing of signals in units of VT1.5 in a SONET network by converting a DS3 signal to a VT1.5 signal, and providing a direct interface to a DS3 network, comprising:

DS3/DS2 demultiplexing means for demultiplexing and converting a DS3 signal to DS2 signals;

DS2/DS1 demultiplexing means for demultiplexing and converting DS2 signals to DS1 signals;

memory means for DS1 format conversion for recording data in order to compensate for a frequency off-set generated while demultiplexing and converting a DS3 signal to DS1 signals via DS2 signals, and outputting data synchronized with a supplied clock;

clock generating means for a SONET VT network for supplying a clock signal in order to output data stored in said memory means for DS1 format conversion at the data rate of the SONET VT network;

DS1/VT1.5 multiplexing means for multiplexing and converting DS1 signals to a VT1.5 signal synchronized with the clock generated by said clock generating means for a SONET VT network;

VT1.5/STS1 multiplexing means for multiplexing and converting VT1.5 signals to an STS1 signal;

STS1/VT1.5 demultiplexing means for demultiplexing and converting an STS1 signal to VT1.5 signals;

VT1.5/DS1 demultiplexing means for demultiplexing and converting VT1.5 signals to DS1 signals;

clock generating means for a DS3 network for generating a clock signal synchronous with the data rate of the DS3 network;

DS1 clock generating means for generating a clock signal synchronous with a DS1 signal;

memory means for SONET destuff for storing data in order to compensate for a frequency off-set generated while demultiplexing and converting an STS1 signal to DS1 signals via VT1.5 signals, and outputting data synchronized with the clock signal generated by said DS1 clock generating means;

DS1/DS2 multiplexing means for multiplexing and converting DS1 signals to DS2 signals synchronized with the clock signal generated by said clock generating means for said DS3 network;

DS2/DS3 multiplexing means for multiplexing and converting DS2 signals to a DS3 signal synchronized with the clock signal generated by said clock generating means for said DS3 network.

2. The interface apparatus according to claim 1, wherein when connecting a SONET network to a DS3 network, a clock signal synchronous with a DS3 signal is used for multiplexing and converting DS1 signals demultiplexed from the SONET network to a DS3 signal.

3. The interface apparatus according to claim 1, wherein when interfacing a SONET network to a DS3 network, information on the alarms of both DS2 and DS1 signals being signals in a DSn network is transmitted to the SONET network.

4. The interface apparatus according to claim 3, wherein when converting a DS3 signal to a DS2 signal, and then to a DS1 signal, the alarm information contained in both DS3 and DS2 signals is inserted in the DS1 signal as the alarm indication signal of the DS1 signal.

5. The interface apparatus according to claim 3, wherein when converting an STS1 signal to a VT1.5 signal, and then to a DS1 signal, the alarm information contained in both STS1 and VT1.5 signals is inserted in the DS1 signal as the alarm indication signal of the DS1 signal.

6. The interface apparatus according to claim 1, wherein when converting an STS1 signal to a DS3 signal, and converting a DS3 signal to an STS1, the input and output of the DS1 signals generated in the middle of the processes are interfaced as they are digital signals.

7. The interface apparatus according to claim 1, wherein when converting an STS1 signal to a VT1.5 signal, and then to a DS1 signal, said memory means for SONET destuff provided on the latter stage of said VT1.5/DS1 demultiplexing means for demultiplexing and converting a DS1 signal from a VT1.5 signal suppresses jitters due to a frequency off-set generated when converting a SONET signal to a DSn signal.

8. An interface apparatus between a first network supporting data signals with a plurality of different transmission rates and a second network not synchronous with the first network, and with a higher transmission rate than the first network, comprising:

demultiplexing means for demultiplexing and converting by stages the data signal of said first network from a data signal with a higher transmission rate to a data signal with a lower transmission rate, generating a data signal with the lowest transmission rate, and extracting failure information on each stage of the demultiplexing and conversion; and multiplexing means for inserting said failure information in said data signal with the lowest transmission rate, multiplexing and converting said data signal with the lowest transmission rate to a first data signal with a low transmission rate supported by said second network, and multiplexing and converting the first data signal to a second data signal with a standard transmission rate supported by said second network.

9. The interface apparatus according to claim 8, which transmits the information obtained on each stage of the demultiplexing and conversion of said demultiplexing means to said first network, and by also transmitting the failure information to a second network, the manager of the second network monitors the failure information in the second network and the failure information in the first network.

10. The interface apparatus according to claim 8, wherein a data signal in which the frequency fluctuation of said data signal with the lowest transmission rate generated by demultiplexing process is compensated, is generated by storing a data signal with the lowest transmission rate generated by the demultiplexing means in a memory and outputting data stored in the memory synchronously with a predetermined clock.

11. A method of interfacing between a first network supporting data signals with a plurality of different transmission rates, and a second network not synchronous with the first network, and with a higher transmission rate than the first network, comprising the steps of:

(a) demultiplexing and converting by stages the data signal of said first network from a data signal with a higher transmission rate to a data signal with a lower transmission rate, generating a data signal with the lowest transmission rate, and extracting failure information on each stage of the demultiplexing and conversion; and (b) inserting said failure information in said data signal with the lowest transmission rate, multiplexing and converting said data signal with the lowest transmission rate to a first data signal with a low transmission rate supported by said second network, and multiplexing and converting the first data signal to a second data signal with a standard transmission rate supported by said second network.

12. The method according to claim 11, wherein the information obtained on each stage of the demultiplexing and conversion of said step (a) is transmitted to said first network, and by also transmitting the failure information to a second network, the manager of the second network monitors the failure information in the second network and the failure information in the first network.

13. The method according to claim 11, wherein said data signal with the lowest transmission rate generated by said step (a) are stored in a memory, and by outputting the data stored in the memory synchronized with a predetermined clock, said data signal with the lowest transmission rate generated by the demultiplexing and conversion process the frequency fluctuation of which is compensated, is generated.

14. An interface apparatus between a first network supporting data signals with a plurality of different transmission rates, and a second network not synchronous with the first network, and with a higher transmission rate than the first network, comprising:

demultiplexing means for demultiplexing and converting a data signal with the standard transmission rate of said second network, to a data signal synchronous with a data signal with the standard transmission rate, and with a lower transmission rate than the standard transmission rate, demultiplexing and converting the data signal to a data signal with the lowest transmission rate of said first network, and extracting failure information on each stage of the demultiplexing and conversion; and inserting said failure information in said data signal with the lowest transmission rate of said first network, and multiplexing and converting by stages the data signal with the lowest transmission rate to a data signal supported by said first network, and with a higher transmission rate.

15. The interface apparatus according to claim 14, which stores the data signal with the lowest transmission rate of said first network generated by said demultiplexing means in a memory, and by outputting the data stored in the memory synchronized with a predetermined clock, generates a data signal for compensating for the frequency fluctuation of said data signal with the lowest transmission rate generated by the demultiplexing and conversion process.

16. The interface apparatus according to claim 14, wherein said multiplexing and converting means comprises a clock generating means for generating a clock synchronous with the transmission rate of a data signal to be finally obtained by the multiplexing and conversion and said multiplexing and converting means executes said multiplexing and conversion process by stages synchronized with a clock generated by said clock generating means.

17. A method of interfacing between a first network supporting data signals with a plurality of different transmission rates, and a second network not synchronous with the first network, and with a higher transmission rate than the first network, comprising the steps of:

(a) demultiplexing and converting the data signal with the standard transmission rate of said second network to a data signal synchronous with a data signal with the standard transmission rate, and with a data signal with a lower transmission rate than the standard transmission rate, demultiplexing and converting the data signal to a data signal with the lowest transmission rate of said first network, and extracting failure information on each stage of the demultiplexing and conversion; and (b) inserting said failure information in said data signal with the lowest transmission rate of said first network, and multiplexing and converting by stages said data signal with the lowest transmission rate to a data signal with a higher transmission rate supported by said first network.

18. The method according to claim 17, wherein the data signal with the lowest transmission rate of said first network generated by said step (a) is stored in a memory, and by outputting the data stored in the memory synchronized with a predetermined clock, said data signal with the lowest transmission rate generated by the demultiplexing and conversion process, the frequency fluctuation of which is compensated, is generated.

19. The method according to claim 17, which further comprises a step (c) for generating a clock signal synchronous with the transmission rate of a data signal to be finally obtained by the multiplexing and conversion process of said step (b), and by which the multiplexing and conversion process in said step (b) is executed by stages synchronized with a clock signal generated in said step (c).

* * * * *